United States Patent
Schellekens et al.

(10) Patent No.: US 10,214,252 B2
(45) Date of Patent: Feb. 26, 2019

(54) DRAG REDUCING AERODYNAMIC VEHICLE COMPONENTS AND METHODS OF MAKING THE SAME

(71) Applicant: SABIC Global Technologies B.V., Bergen op Zoom (NL)

(72) Inventors: Geert Jan Schellekens, Gilze (NL); Claire Marie-Annick Martin, Maaseik (BE); Carlos Pereira, Putnam Valley, NY (US); Max Morton, Pittsfield, MA (US); Matthew Marks, Waterford, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/592,738

(22) Filed: May 11, 2017

(65) Prior Publication Data
US 2018/0001943 A1   Jan. 4, 2018

Related U.S. Application Data

(63) Continuation-in-part of application No. PCT/US2015/060529, filed on Nov. 13, 2015.
(Continued)

(51) Int. Cl.
*B62D 35/00* (2006.01)
*B29C 45/00* (2006.01)
(Continued)

(52) U.S. Cl.
CPC ........ *B62D 35/001* (2013.01); *B29C 45/0001* (2013.01); *B29C 45/40* (2013.01);
(Continued)

(58) Field of Classification Search
CPC .............. B62D 35/001; B29C 45/0001; B29L 2031/3058
(Continued)

(56) References Cited

U.S. PATENT DOCUMENTS

| 4,103,957 A | 8/1978 | Landry et al. |
|---|---|---|
| 4,245,862 A | 1/1981 | Buckley, Jr. |

(Continued)

FOREIGN PATENT DOCUMENTS

| CA | 2020546 C | 2/1991 |
|---|---|---|
| CN | 2247622 Y | 2/1997 |

(Continued)

OTHER PUBLICATIONS

Browand, F., "Reducing Aerodynamic Drag and Fuel Consumption", Global Climate and Energy Project, Advanced Transportation Workshop, (Oct. 2005), Stanford University, 27 Pages.
(Continued)

*Primary Examiner* — Jason S Morrow
*Assistant Examiner* — E Turner Hicks
(74) *Attorney, Agent, or Firm* — Cantor Colburn LLP

(57) ABSTRACT

A process of making a drag-reducing aerodynamic vehicle system includes injection molding a body configured for attachment to a roof of a vehicle with a sliding core, wherein the body comprises an air inlet extending through a surface of the body, wherein the air inlet includes an air guide boss extending from an interior surface of the body, wherein the air guide boss adjusts an air stagnation point away from the windshield to reduce air pressure and drag on the vehicle; and ejecting the drag-reducing aerodynamic vehicle system from the injection mold using the sliding core.

18 Claims, 18 Drawing Sheets

Related U.S. Application Data

(60) Provisional application No. 62/200,314, filed on Aug. 3, 2015, provisional application No. 62/079,494, filed on Nov. 13, 2014.

(51) Int. Cl.
| | |
|---|---|
| *B29C 45/40* | (2006.01) |
| *B29K 9/06* | (2006.01) |
| *B29K 23/00* | (2006.01) |
| *B29K 25/00* | (2006.01) |
| *B29K 27/06* | (2006.01) |
| *B29K 55/02* | (2006.01) |
| *B29K 67/00* | (2006.01) |
| *B29K 77/00* | (2006.01) |
| *B29K 81/00* | (2006.01) |
| *B29L 31/30* | (2006.01) |

(52) U.S. Cl.
CPC ...... *B29K 2009/06* (2013.01); *B29K 2023/06* (2013.01); *B29K 2023/16* (2013.01); *B29K 2023/18* (2013.01); *B29K 2025/08* (2013.01); *B29K 2027/06* (2013.01); *B29K 2055/02* (2013.01); *B29K 2067/003* (2013.01); *B29K 2067/006* (2013.01); *B29K 2077/00* (2013.01); *B29K 2081/04* (2013.01); *B29L 2031/3058* (2013.01)

(58) Field of Classification Search
USPC .................. 296/180.1, 180.2, 180.3, 181.5
See application file for complete search history.

(56) References Cited

U.S. PATENT DOCUMENTS

| | | | |
|---|---|---|---|
| 4,290,639 A | 9/1981 | Herpel | |
| 4,318,566 A | 3/1982 | Fitzjarrell | |
| 4,343,506 A * | 8/1982 | Saltzman | B62D 35/001 105/1.2 |
| 4,353,587 A | 10/1982 | Brenholt | |
| 4,408,792 A | 10/1983 | Sullivan | |
| 4,611,796 A * | 9/1986 | Orr | B60T 1/16 180/903 |
| 4,932,716 A | 6/1990 | Marlowe et al. | |
| 4,957,322 A * | 9/1990 | Marlowe | B62D 35/001 296/180.2 |
| 5,018,779 A | 5/1991 | Lund | |
| 5,174,626 A | 12/1992 | Wiley, Jr. et al. | |
| 5,249,837 A | 10/1993 | Luttrell | |
| 5,755,485 A | 5/1998 | Christie et al. | |
| 6,099,069 A * | 8/2000 | Spears | B60T 1/16 296/180.2 |
| 6,183,041 B1 | 2/2001 | Wilson | |
| 6,217,107 B1 | 4/2001 | Langlois | |
| 6,991,281 B2 | 1/2006 | Spence et al. | |
| 7,121,614 B2 | 10/2006 | Kawai | |
| 8,162,382 B2 | 4/2012 | Hjelm et al. | |
| 8,403,400 B2 | 3/2013 | Brewer | |
| 8,801,077 B2 | 8/2014 | Vogel et al. | |
| 8,807,628 B1 | 8/2014 | Pfaff | |
| 8,807,630 B2 * | 8/2014 | Rode | B60K 11/085 296/180.2 |
| 2007/0257513 A1 | 11/2007 | Schwartz | |

FOREIGN PATENT DOCUMENTS

| | | |
|---|---|---|
| CN | 203005579 U | 6/2013 |
| GB | 2459186 A | 10/2009 |
| JP | S5739881 U | 3/1982 |
| JP | S5795264 A | 6/1982 |
| JP | 2001334962 A | 12/2001 |
| WO | 2008140362 A1 | 11/2008 |
| WO | 2010026444 A1 | 3/2010 |
| WO | 2013082484 A1 | 6/2013 |
| WO | 2016077669 A1 | 5/2015 |

OTHER PUBLICATIONS

Galipeau-Belair, "Design and Development of Side Underride Protection Devices (SUPD) for Heavy Vehicles," Master Degree Thesis, (Apr. 2014), 134 Pages.
International Search Report for International Application No. PCT/US2015/060529; dated Feb. 3, 2016; 7 Pages.
Japanese Patent No. 2001334962A; Date of Publication: Dec. 4, 2001; Abstract Only, 2 pages.
Japanese Patent No. S5739881U; Date of Publication: Mar. 3, 1982; English Translation; 7 pages.
Japanese Patent No. S5795264A; Date of Publication: Jun. 14, 1982; Abstract Only, 2 pages.
Pereira, C. et al., "Drag Reduction Optimization of a Day Cab Roof Failing—Design and Validation", SAE International, 2015, 6 pages.
Written Opinion of the International Search Report for International Application No. PCT/US2015/060529; dated Feb. 3, 2016; 10 Pages.
Written Opinion of the International Search Report for International Application No. PCT/US2015/060529; dated Oct. 13, 2016; 6 Pages.
Chinese Patent No. 203005579; Date of Publication: Jun. 19, 2013; Abstract Only, 1 page.
Chinese Patent No. 2247622; Date of Publication: Feb. 19, 1997; Abstract Only, 1 page.

\* cited by examiner

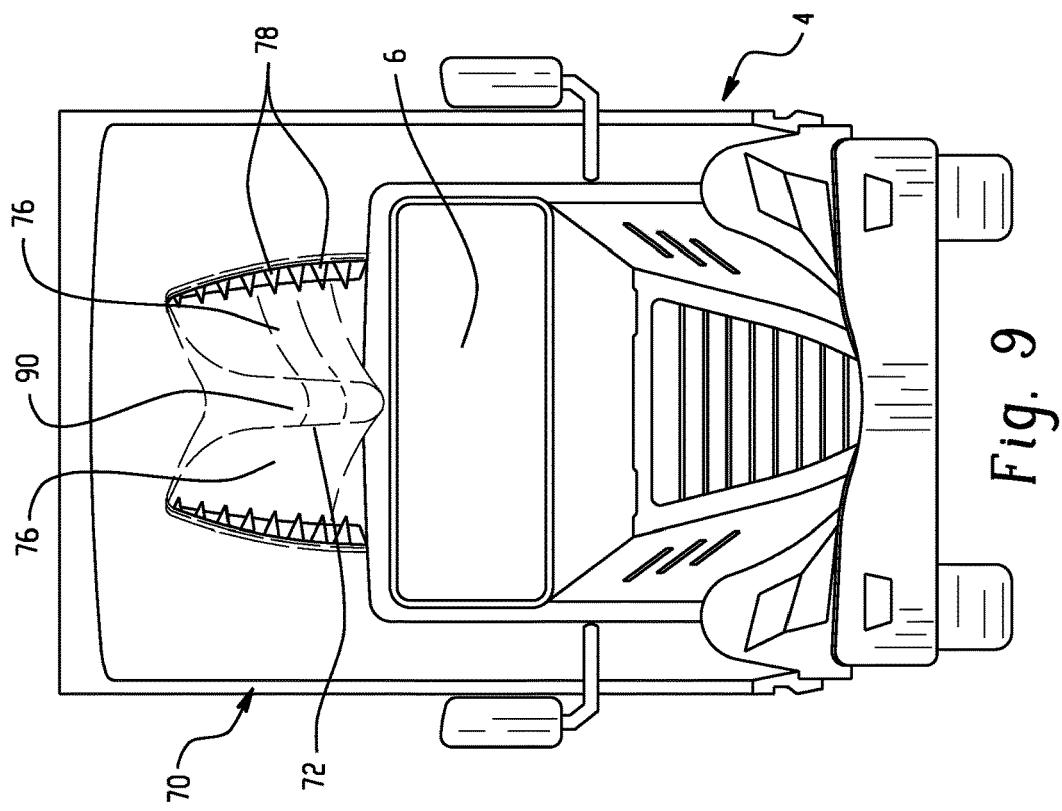
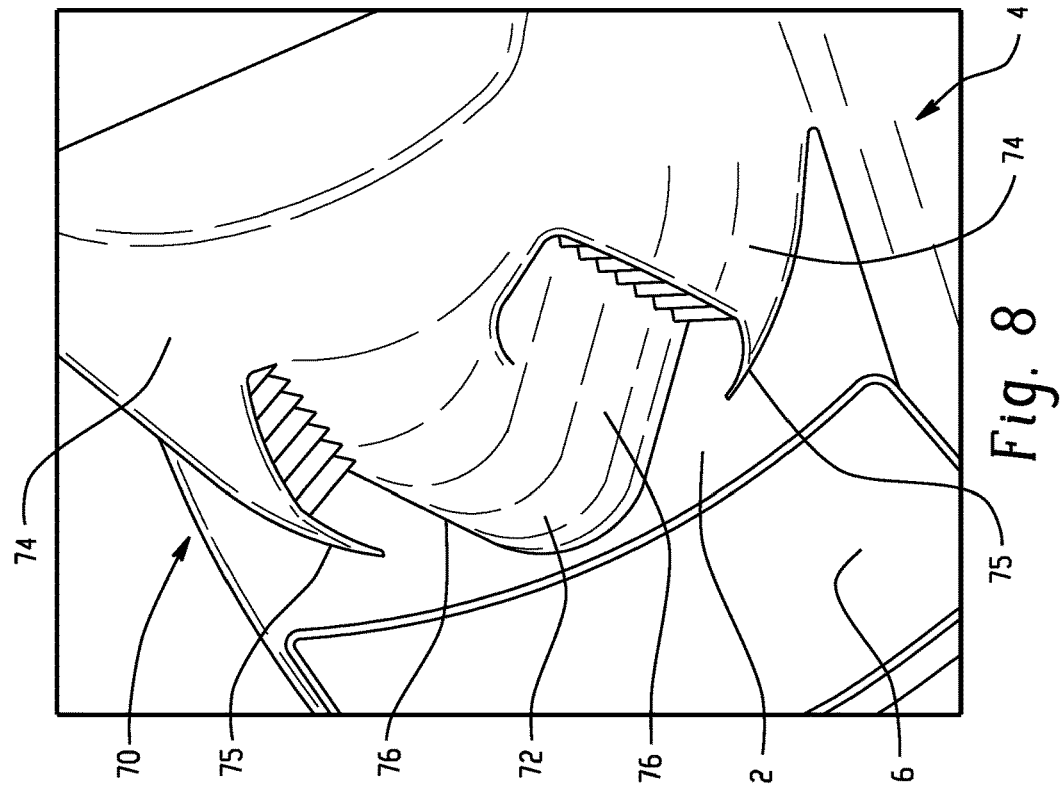

DRAG REDUCING AERODYNAMIC VEHICLE COMPONENTS AND METHODS OF MAKING THE SAME

CROSS REFERENCE TO RELATED APPLICATION

This application is a continuation in part of International Application No. PCT/US2015/060529, filed Nov. 13, 2015, which claims priority to U.S. Application No. 62/079,494, filed Nov. 13, 2014, and U.S. Application No. 62/200,314, filed Aug. 3, 2015, all of which are hereby incorporated by reference in their entirety.

BACKGROUND

Vehicle original equipment manufacturers and fleet owners are continually looking for solutions to improve vehicle mileage and emissions. Regulations are currently being drafted worldwide that will enforce the further reduction of vehicle emissions. Thermoset and fiberglass reinforced plastic materials are currently used, but these materials are limited in their forming operations. Solutions which can improve vehicle mileage and reduce vehicle emissions are continually desired.

JP 2011-334962 discloses reducing the entrainment of airflow in the rear end of a straightening plate to reduce the air collided to a rear body.

JP S57-39881 discloses a fairing system for a truck with a center fairing attached to the truck.

JP S57-095264 discloses the reduction of air resistance by deviating air flow to be generated at a time of traveling to the upper part and the right and left of a cargo body by a method wherein there air passages are provided on the roof of a cab of a truck.

BRIEF DESCRIPTION

A drag-reducing aerodynamic vehicle system, includes: a body attached to a roof of a vehicle, wherein the body comprises an air inlet including slits in the body, wherein the slits are disposed laterally to one another on opposing sides of a bisection of the vehicle and wherein the slits extend a length all or part of the way from a top of the body to a bottom of the body; wherein the air inlet includes an air guide boss extending from an interior surface of the body; wherein the air guide boss adjusts an air stagnation point away from the windshield and accelerates air flow between the vehicle and a trailer attached to the vehicle to prevent air recirculation to reduce air pressure and drag on the vehicle.

A drag-reducing aerodynamic vehicle system, including: a central fairing extending from a roof of a vehicle; and side fairings disposed on either exterior end surface of the central fairing, wherein the side fairings comprise airflow guide vanes protruding from an interior surface of the side fairings, wherein the airflow guide vanes attach to an exterior end surface of the central fairing; wherein air flows through the airflow guide vanes and is directed toward a rear of the vehicle to reduce air stagnation around the vehicle and accelerates air flow between the vehicle and a trailer attached to the vehicle to prevent air recirculation to reduce air pressure and drag on the vehicle.

A drag-reducing aerodynamic vehicle system, including: a frontal member in physical communication with a rear member, wherein the frontal member and the rear member extend from a roof of a vehicle, wherein the frontal member comprises fin boxes having airflow guide vanes disposed perpendicularly between sidewalls of the fin boxes; wherein air flows through the airflow guide vanes and is directed toward a rear of the vehicle to reduce air stagnation around the vehicle; and wherein the air flow guide vanes accelerate air flow between the vehicle and a trailer attached to the vehicle to prevent air circulation and reduce drag on the vehicle.

The above described and other features are exemplified by the following figures and detailed description.

BRIEF DESCRIPTION OF THE DRAWINGS

Refer now to the figures, which are exemplary embodiments, and wherein the like elements are numbered alike.

FIG. 8 is a side view of another drag-reducing aerodynamic system.

FIG. 9 is a front view of the drag-reducing aerodynamic system of FIG. 8 attached to a vehicle.

DETAILED DESCRIPTION

Developments in aerodynamics have long been assumed to yield advancements in vehicle fuel efficiency. It can be difficult to improve vehicle mileage (e.g., through improved fuel economy) and emissions. However, increasing vehicle miles per gallon and reducing vehicle emissions can be advantageous in terms of lowering operating costs and complying with emission and fuel economy regulatory requirements. For example truck original equipment manufacturers as well as owners of fleets of trucks continually desire improved vehicle mileage and reduced emissions to reduce operating costs and be more environmentally friendly. For example, a model Class 8 tractor-trailer can weigh up to approximately 37,000 kilograms (kg) (approximately 80,000 pounds) and can have a wind averaged drag coefficient ($C_D$) of approximately 0.60. At a highway speed of 65 miles per hour (mph) (104.6 kilometers per hour (kph)), about 65% of the total energy expended goes to overcome the aerodynamic drag. Hence, fuel savings and cost of operating a vehicle, e.g., a truck, can be optimized by improving aerodynamic performance. Contributors to aerodynamic drag of a tractor-trailer combination can include stagnation pressures at a front end, turbulent in-flows at a gap between the truck tractor and the trailer gap, underside flow, and wake at a rear of the trailer. An optimized design of the roof fairing can allow a reduction in stagnation pressure. An optimized design of the roof fairing can allow a minimization of upper in-flows at the tractor-trailer gap. An optimized design of the roof fairing can allow a favorable alteration of the trailer wake. Disclosed herein are aerodynamic systems for a vehicle, e.g. a roof fairing, wherein the aerodynamic systems can be composed from a polymeric material.

Figure 18:
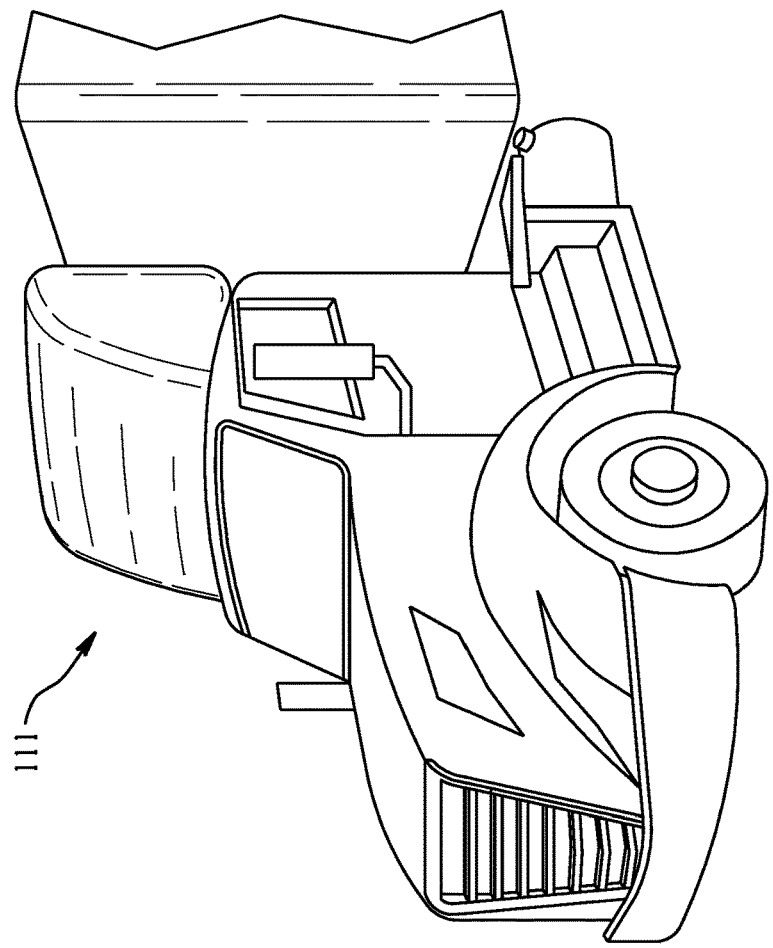
FIG. 18 is an isometric view of a baseline roof fairing without side extenders.

A variety of injection moldable thermoplastic roof fairing designs for a heavy truck day cab to quantify efficiencies that could be obtained through advanced aerodynamics were evaluated. Computational Fluid Dynamic (CFD) modeling was performed on the various designs. Several designs exhibited significant reductions in drag compared to a baseline roof fairing with side extensions (FIG. 17) and a baseline roof fairing without side extensions (FIG. 18), wherein the baseline roof fairings represented top performing currently available roof fairings. The roof fairings disclosed herein can achieve at least a 5.8% reduction in cumulative drag as compared to the baseline. Under the well-established 2:1 relationship between delta drag and fuel use, the fuel efficiency can be improved by nearly 3% from the baseline design. (AIAA Paper 2004-2249, by Rose McCallen and others (National Labs and NASA; Reducing Aerodynamic Drag and Fuel Consumption", Dr. Fred Browand, Aerospace and Mechanical Engineering, Viterbi School of Engineering Presented at University of Southern California for Global Climate & Energy Project Workshop on Advanced Transportation, Oct. 10-11, 2002.) The AIAA paper states that overcoming aerodynamic drag represents about 65% of total energy expenditure for a typical heavy truck running at a steady 70 miles per hour (mph) and uses a 2:1 ratio between delta drag and fuel use in projection fuel savings. Browand shows an equation with a factor that is dependent on the driving cycle where the factor ranges from 0.5 to 0.7. If the 0.5 factor value is used and the equation is rearranged, the 2:1 ratio can be derived to describe that a 2% reduction in the drag coefficient will result in a 1% reduction in fuel consumption. The concepts disclosed include an optimized shape to manage the airflow over the vehicle and enable reduced drag and increased fuel economy. Air channels developed for injection molding processes can limit the air stagnation on the front of the trailer as well as accelerate and control the direction of the air flow. CFD models have validated this concept.

The aerodynamic systems disclosed herein can be configured to reduce drag on the vehicle which in turn, can increase fuel economy. Air channels formed in the aerodynamic systems can assist in limiting frontal air stagnation. Air channels formed in the aerodynamic systems can assist in accelerating the air flow of air contacting the vehicle. Air channels formed in the aerodynamic systems can assist in controlling, directing, or redirecting the air flow around the vehicle. The aerodynamic systems can be formed integrally or in multiple pieces and assembled. For example, in an aerodynamic system with sliding cores, the aerodynamic system can be formed by an injection molding process in a one shot process. In designs in which airflow guide vanes are present in the aerodynamic system, multiple pieces can be formed and thereafter assembled.

Drag can be described as the retarding force acting on a body moving through a fluid (i.e., air) parallel and opposite to the direction of motion. Optimization of airflow around some vehicle components can reduce a vehicle's drag and therefore can increase a vehicle's fuel economy while also reducing emissions. The vehicle components can include a truck tractor and trailer. The aerodynamic systems disclosed herein can include a roof fairing on a truck tractor to reduce the drag experienced by the truck. The aerodynamic systems can include a bulbous shape to redirect and redistribute air upward and around the truck tractor and trailer. The aerodynamic systems can include air inlets on the roof fairing that can allow air to pass through the roof fairing and be directed around the truck, thereby reducing the drag experienced by the truck. The aerodynamic systems can include air channels formed on the aerodynamic system to direct the airflow around the truck, thereby reducing the drag experienced by the truck. The aerodynamic systems can include airflow guide vanes that can allow air to pass through the roof fairing and that can optionally direct the airflow around the truck to reducing the track experienced by the truck. The designs of the aerodynamic systems disclosed herein can control air flow around a vehicle, e.g., a truck tractor and trailer, which can restrict and accelerate the air flow vertically up and around the tractor and trailer. Such a design can assist in preventing air stagnation or recirculation between the truck tractor and the trailer, both of which would increase the drag. For example, the drag-reducing aerodynamic systems when attached to a vehicle can provide a 1% to 5% increase in fuel economy as compared to a baseline roof fairing attached to the same vehicle, for example, 1.5%, for example, 2.5%, for example, 3%, for example 3.5%.

A drag-reducing aerodynamic vehicle system can be attached to a roof of a vehicle, to the cab corners of a vehicle, to the bumper portion of a vehicle, to the headlamp portion of a vehicle. The drag-reducing aerodynamic vehicle system can include a body. The body can, for example, be attached to a roof of a vehicle. The body can include an air inlet extending through a surface of the body. The air inlet can include an air guide boss extending from an interior surface of the body. The air guide boss can be configured to adjust an air stagnation point in such a way as to remove the stagnant air in front of the drag-reducing aerodynamic vehicle system and possibly influence the stagnation in front of the windshield, thereby reducing air pressure and drag on the vehicle. The drag-reducing aerodynamic vehicle system can provide the vehicle with at least a 2.6% improvement in fuel economy as compared to a vehicle with a baseline roof fairing.

A drag-reducing aerodynamic vehicle system can include a center piece. When attached to a vehicle, the center piece can protrude from a roof of the vehicle. The center piece can include a base having a wider section further from a vehicle windshield than a portion of the base converging toward a narrower section proximate to the vehicle windshield. Top surface channels can be formed along the base of the center piece with the center piece protruding upward from the top surface channels. Side surface channels can be formed by a raised edge of a portion of a planar face of the top surface channels and a ledge extending from another portion of the planar face of the top surface channels. Air directing and air fragmenting channels can be formed in the top surface channels. Air directing and air fragmenting channels can be formed in the side surface channels. The surface channels can assist in fragmenting the air flow toward the vehicle between the top surface channel and the side surface channels. Such a fragmentation in the air can reduce drag forces on the vehicle. The drag-reducing aerodynamic vehicle system can provide the vehicle with a 1.90% improvement in fuel economy as compared to a vehicle with a baseline roof fairing.

A drag-reducing aerodynamic vehicle system can include a central fairing. The central fairing can extend from a roof of a vehicle. Side fairings can be disposed on either side of the central fairing. For example, the side fairings can be disposed on either exterior end surface of the central fairing. The side fairings can comprise airflow guide vanes protruding from an interior surface of the side fairings. The airflow guide vanes can be attached to an exterior surface, for example, an exterior end surface of the side fairings. As a result, air can flow through the airflow guide vanes and can be directed toward a top and/or a side-rear of the vehicle to reduce air stagnation around the vehicle.

The airflow guide vanes of the side fairings can be attached to the central fairing. Attachment of the airflow guide vanes to the side fairings can include mechanical attachments, e.g., hooks, screws, snap-fit, etc.; chemical attachments, e.g., adhesives; or a combination of mechanical attachments and chemical attachments. For example, the air flow guide vanes can slide into corresponding recesses disposed on the exterior end surfaces of the central fairing. The airflow guide vanes can be mechanically attached to the recesses. The airflow guide vanes can be chemically attached to the recesses. The airflow guide vanes can be mechanically and chemically attached to the recesses.

The central fairing can optionally include support vanes extending from an air facing surface of the central fairing; e.g., the surface of the central fairing opposite that facing the vehicle. The support vanes can assist in attaching the side fairings to the central fairing. For example, the support vanes can attach a bottom surface of the side fairings to the support vanes extending from the central fairing. The side fairings can include airflow guide vanes configured to mate with the central fairing to facilitate airflow therethrough. The side fairings can extend over the central fairing and attach to the support vanes with a bridge extending from each side fairing. The side fairings can include a left side fairing and a right side fairing and a left bridge and a right bridge. The left side fairing and the right side fairing can come together at a center point of the central fairing. The left side fairing the right side fairing can be attached to one another and to the support vanes. The left side fairing and the right side fairing can be attached to the support vanes and not to one another. The side fairing can be an integrated one piece fairing extending from one end of the central fairing to the other end of the central fairing attached to the central fairing by the support vanes.

The exterior end surfaces of the central fairing can converge toward a pedestal of the central fairing. The pedestal can be located at a mid-point of the central fairing. The pedestal can have a convex shape. The pedestal can have a concave shape. A vehicle to which the drag-reducing aerodynamic system comprising a central fairing, side fairings, and optional support vanes is attached can have a 2.60% improvement in fuel economy as compared to a vehicle with a baseline roof fairing. The airflow guide vanes can extend angularly from an interior surface of the side fairings. The airflow guide vanes can extend horizontally from the interior surface of the side fairings. The angle at which the air flow guide vanes extend can be 0° to 90°.

A drag-reducing aerodynamic vehicle system can include a frontal member including fin boxes and a rear member including fin boxes. The frontal member and the rear member can be attached to each other through mechanical attachments, e.g., hooks, screws, snap-fit, etc.; chemical attachments, e.g., adhesives; or a combination of mechanical attachments and chemical attachments.

As described herein, a baseline roof fairing refers to a roof fairing that does not include the drag-reducing, air stagnation reducing, air pressure reducing features disclosed herein.

The aerodynamic systems can comprise a metallic material, a polymeric material, a composite material, or a combination comprising at least one of the foregoing. The aerodynamic systems can comprise any polymeric material or combination of polymeric materials that can be formed into the desired shape and provide the desired properties. Exemplary materials include polymeric materials as well as combinations of polymeric materials with elastomeric materials, and/or thermoset materials. Exemplary materials can also include elastomeric materials or thermoset materials. In one embodiment, the polymeric materials comprise thermoplastic polymeric materials. Possible thermoplastic polymeric materials include polybutylene terephthalate (PBT); acrylonitrile-butadiene-styrene (ABS, CYCOLOY™ resins, commercially available from SABIC's Innovative Plastics business); polycarbonate (LEXAN™ and LEXAN™ EXL resins, commercially available from SABIC's Innovative Plastics business); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC's Innovative Plastics business); blends of polycarbonate/PET/PBT; PBT and impact modifier (XENOY™ resins, commercially available from SABIC's Innovative Plastics business); polyamides (Nylon 6, Nylon 6-6, Nylon 6-9, Nylon 6-10, Nylon 6-12, Nylon 11, Nylon 12, Nylon 4-6, etc.); phenylene sulfide resins; polyvinyl chloride (PVC); high impact polystyrene (HIPS); polyolefins, e.g., low/high density polyethylene (L/HDPE), polypropylene (PP), expanded polypropylene (EPP); polyethylene and fiber composites; polypropylene and fiber composites (AZDEL Superlite™ sheets, commercially available from Azdel, Inc.); long fiber reinforced thermoplastics (VERTON™ resins, commercially available from SABIC's Innovative Plastics business), thermoplastic olefins (TPO), and carbon fiber reinforced polymeric composites (CFRP), as well as combinations comprising at least one of the foregoing.

An exemplary filled resin is STAMAX™ resin, which is a long glass fiber filled polypropylene resin also commercially available from SABIC's Innovative Plastics business. Some possible reinforcing materials include fibers, such as glass, carbon, and so forth, as well as combinations comprising at least one of the foregoing; e.g., long glass fibers and/or long carbon fiber reinforced resins. For example, carbon fiber reinforced polymeric composites can be utilized to form the lobes. Carbon fiber reinforced polymeric composites can be used as a coating (e.g., skin) on the lobes to provide the desired structural integrity to the lobes. The lobes can be formed from combinations comprising at least one of any of the above-described materials.

Processes for making the drag-reducing aerodynamic systems disclosed herein are also contemplated. For example, various molding processes can be used to make the drag-reducing aerodynamic systems including, but not limited to, injection molding, thermoforming, compression molding, additive manufacturing, etc.

A process of making a drag-reducing aerodynamic vehicle system can include injection molding a central fairing including exterior end surfaces, injection molding side fairings comprising airflow guide vanes protruding from an interior surface of the side fairings, and attaching the side fairings to the central fairing by attaching the airflow guide vanes to the exterior end surfaces of the central fairing. Such a drag-reducing aerodynamic vehicle system can allow air to flow through the air flow guide vanes and the air can be directed toward a rear of the vehicle to reduce air stagnation around the vehicle and thereby reduce overall drag experienced by the vehicle. The process can include molding indentations disposed on exterior end surfaces of the central fairing. The side fairings can be attached to the central fairing by inserting the airflow guide vanes into the indentations. The drag-reducing aerodynamic vehicle system can allow the vehicle to experience an improvement in fuel economy as compared to a vehicle with a baseline roof fairing. The process can include molding support vanes to an air facing surface of the central fairing. Side fairings including a bridge suspended over the central fairing can be attached to the support vanes of the central fairing.

A process of making drag-reducing aerodynamic vehicle system can include injection molding a body configured for attached to a roof of a vehicle with a slide core and ejecting the drag-reducing aerodynamic vehicle system from the mold using the sliding core. The body can comprise an air inlet extending through a surface of the body. The air inlet can include an air guide boss extending from an interior surface of the body.

Any of the drag-reducing aerodynamic vehicle systems can be made by Additive Manufacturing (AM) which is a production technology that makes three-dimensional (3D) solid objects of virtually any shape from a digital model. Generally, this is achieved by creating a digital blueprint of a desired solid object with computer-aided design (CAD) modeling software and then slicing that virtual blueprint into very small digital cross-sections. These cross-sections are formed or deposited in a sequential layering process in an AM machine to create the 3D object.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 1A:
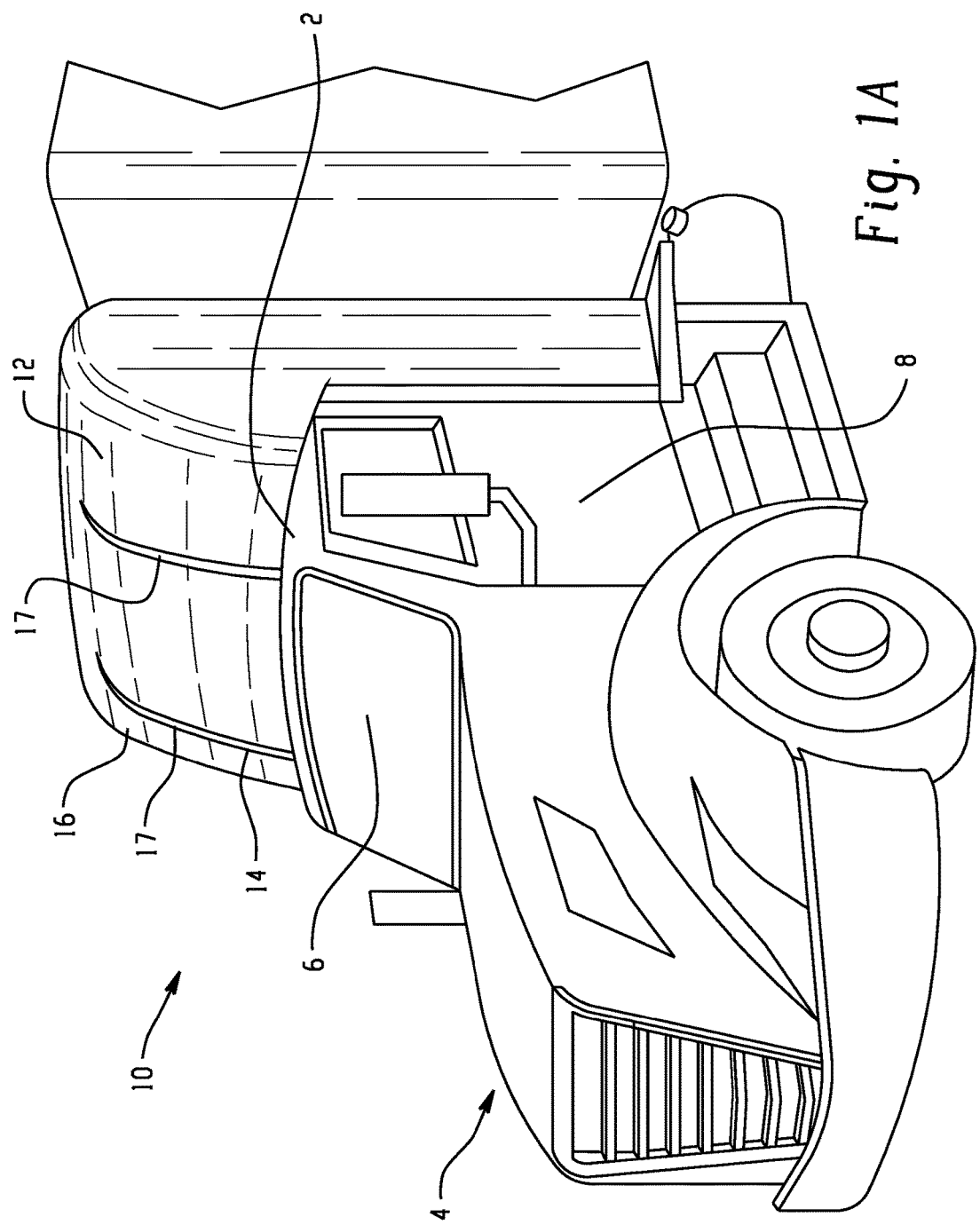
FIG. 1A is a view of a drag-reducing aerodynamic system attached to a vehicle.

FIG. 1A shows a drag-reducing aerodynamic vehicle system 10 (e.g., a fairing) having a body 12 (also referred to as fairing) attached to a roof 2 of a vehicle 4. The body 12 includes an air inlet 14 that can extend through a surface 16 of the body 12. The air inlet 14 includes slits 17 in the body 12, disposed laterally to one another on opposing sides of the lengthwise centerline of the vehicle 4. The slit shapes can be mirror images of one another with respect to a center plane, perpendicular to the road surface, bisecting the vehicle along its length. The slits 17 can open toward a front of the vehicle 4, toward the center plane, or a combination. A slit opening 23 can define, partially or entirely, a plane that is substantially parallel to the center plane. The slit opening 23 can define, at least in part, a plane that intersects with the center plane along a rake axis disposed in the center plane, itself raked backward with respect to the front of the vehicle 4. The slits 17 can extend a length all or part of the way from the top of the fairing 12 to the bottom, and vice versa. The slits openings 23, transverse to the length of the slit 17, can be constant in their width, or can vary. As the air travels through the slits 17, the cross-sectional area of slits 17 can increase, can decrease, or can remain the same. As the air travels through the slits 17, the slits 17 open to a large open space behind the fairing 12. A slit 17 can be narrow at the top of the body 12, and can gradually open as the slit 17 nears the top of the cab 18 (i.e., the roof 2). The fairing 12 can have a curvilinear shape when viewed from the side, and the slit 17 can conform to the curvilinear forward surface of the body 12. The slit openings 23 can be spaced equally from the center plane at the slit top 19 and the slit bottom 21. The distance from the slit opening 23 to the center plane can change from the slit top 19 to the slit bottom 21. The slits 17 can be nearer the center plane at the top 19, and farther from the center plane at the bottom 21. The slits 17 can thus define a wedge shape, narrower at the top, wider at the bottom, that curves as it extends from the top of the fairing 12 to the bottom of the fairing 12, the wedge shape being partially open to a front of the vehicle 4, and partially open to a center plane of the vehicle 4.

Figure 2:
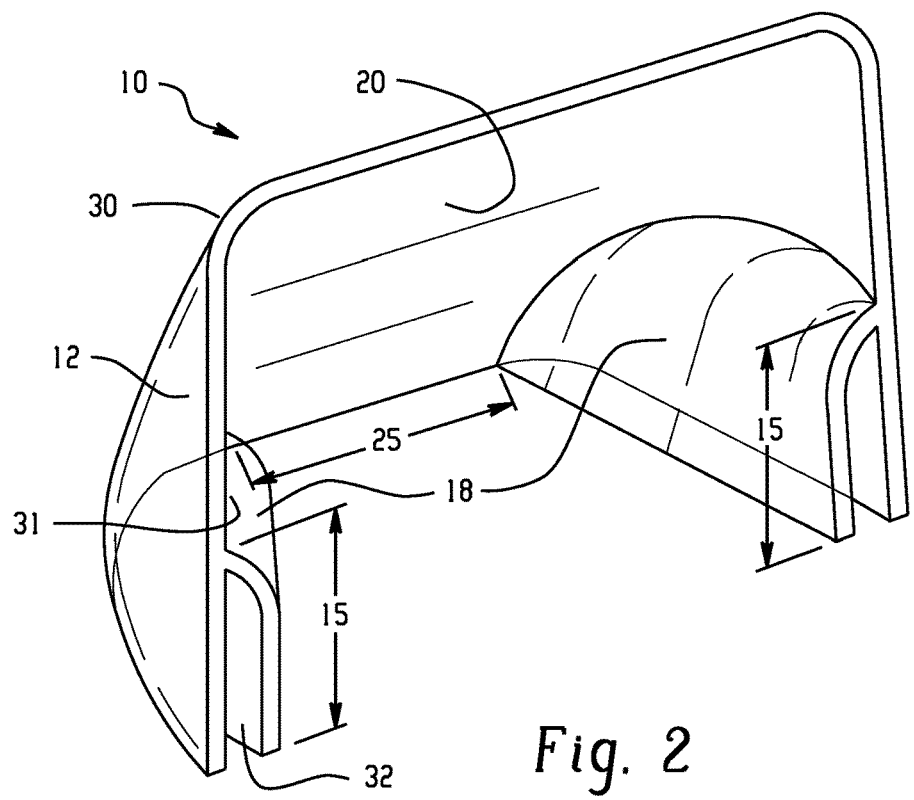
FIG. 2 is a back view of the drag-reducing aerodynamic system of FIG. 1A.

A portion of the body disposed between the slits 17 is a center bump section 25 (see e.g., FIG. 2). The center bump section 25 can define an arc when viewed in cross-section from the top. At a top portion of the center arc section, a cross-section defines an arc of a first radius, and at a bottom portion defines an arc of a second radius larger than the first. The center bump section 25 can be continuous, gradually increasing the arc radius of successive radii from its top to its bottom.

Figure 13:
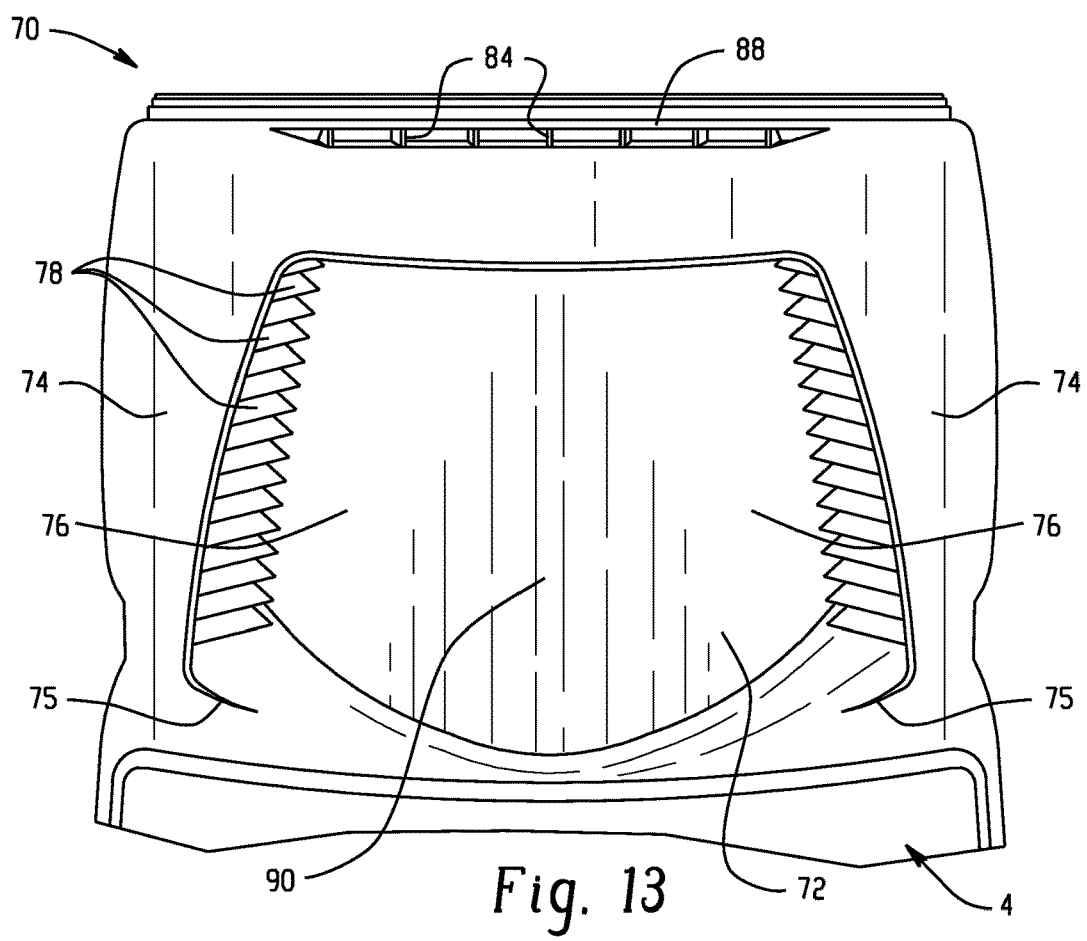
FIG. 13 is another view of a drag-reducing aerodynamic system similar to that shown in FIG. 8.

As discussed herein, one or more louvers (also referred to as airflow guide vanes) can optionally be disposed in the slits 17 (see e.g., FIG. 13). The louvers can be parallel a horizontal surface, or can have a rake with respect to the length of the vehicle. The louvers can have a compound rake, with respect to a length and a width of the vehicle.

Figure 1B:
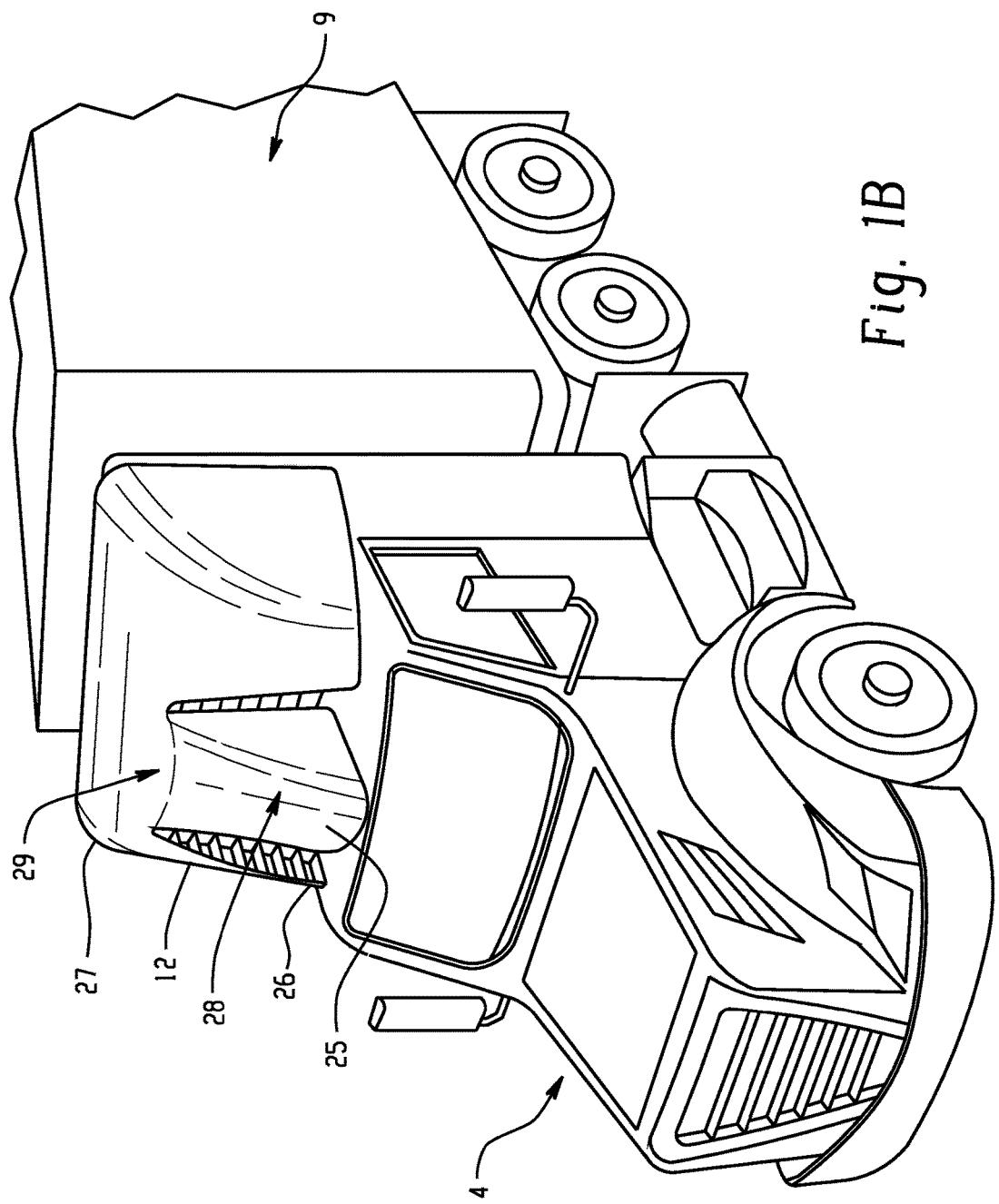
FIG. 1B is a pressure map of a vehicle with airflow moving from front to back with the drag-reducing aerodynamic system of FIG. 1A attached thereto.

FIG. 1B shows a pressure map of the vehicle airflow from front to back. When pictured from a side, the body 12 can have a rake or pitch moving from front to back. The rake can be selected to maintain a relatively constant pressure from the bottom 26 of the fairing 12 to the top 27 of the fairing 12. Thus, the rake can be selected in proportion from the distance to the top 2 of the cab 8. The rake can be changed along the fairing height, with it being greater (that is, closer to perpendicular to the road surface) nearer the top 2 of the cab 8, and lesser (that is, less close to perpendicular) farther from the top 2 of the cab 8. The width of the slit 17 with respect to the distance of a measurement point from the top 2 of the cab 8 can be selected to maintain an overall relatively constant pressure along the forward face of the fairing 12. The slit 17 can close as the pressure map transitions from a high pressure portion 28 to a lower pressure portion 29.

The drag-reducing aerodynamic vehicle system 10 is further shown in FIGS. 2 through 5. For example, as shown in FIG. 2, the fairing 12 of the drag-reducing aerodynamic vehicle system 10 includes air guide bosses 18 extending from an interior surface 20 of the body 12 disposed lateral to one another on opposing sides of the lengthwise centerline of the vehicle 4. The fairing 12 includes a front section 30 and a back section 31. The air guide bosses 18 extend through the fairing 12 toward corresponding air outlets 15 disposed at the back 31 of the fairing 12 creating a channel 32 disposed therebetween. The center bump section 25 extends between the air guide bosses 18. The channels 32 can extend a length all or part of the way from the front 30 of the fairing 12 to the back 31 of the fairing 12. The air guide bosses 18 can define an arc. At a top portion 33 of the air guide boss 18, a cross-section defines an arc of a first radius and a bottom portion 34 of the air guide boss 18 defines an arc of a second radius larger than the first. The air guide bosses 18 can be continuous, gradually increasing the arc radius of successive radii from the top portion 33 to the bottom portion 34. The air guide boss 18 can adjust an air stagnation point away from the vehicle windshield 6 to reduce air pressure and drag on the vehicle 2. The air guide boss 18 can take the air and create accelerated air flow by reducing the distance between the air guide boss 18 and the front 30 of the fairing 12. The accelerated air flow allows the gap between the cab 8 and the trailer 9 to be bridged, therefore preventing the air to recirculate in between, which would increase drag.

Figure 3:
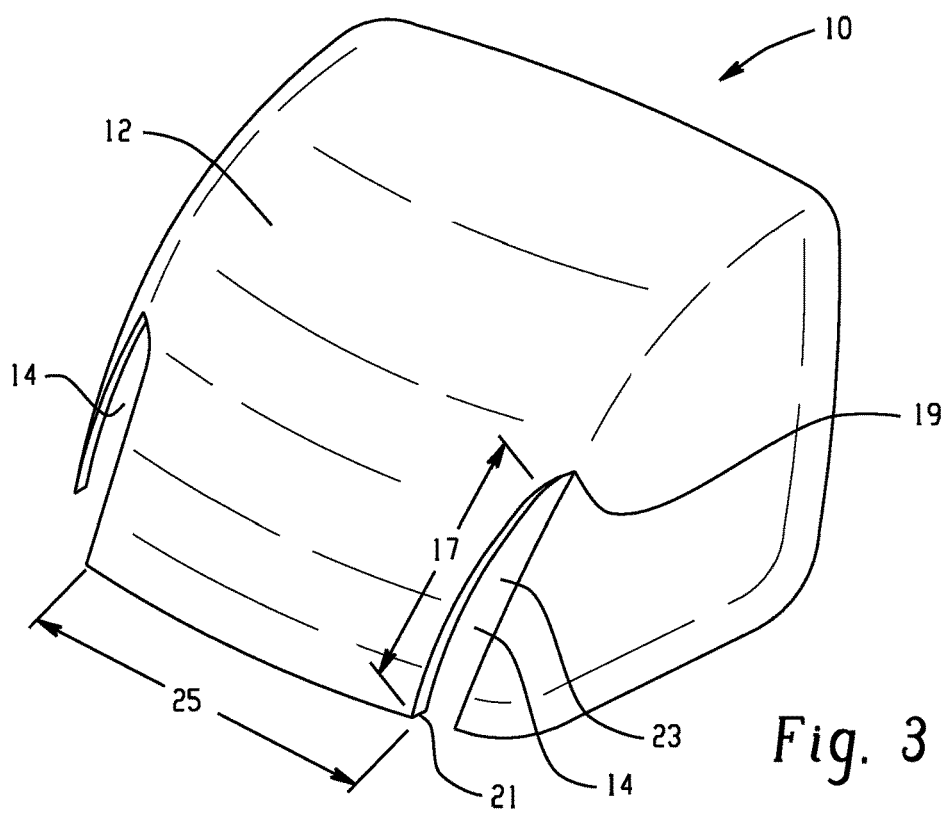
FIG. 3 is a front view of the drag-reducing aerodynamic system of FIG. 1A.

FIG. 3 is a front view of the drag-reducing aerodynamic vehicle system 10. In FIG. 3 the fairing 12 includes air inlets 14 with including slits 17 in the body 12, disposed lateral to one another on opposing sides of the lengthwise centerline of the vehicle 4. The slit shapes can be mirror images of one another with respect to the center plane. As shown in FIG. 3, the slits 17 open toward a front of the vehicle. A slit opening 23 can define, at least in part, a plane intersecting with the center plane along a rake axis disposed in the center plane, with the slit opening 23 itself raked backward with respect to the front of the vehicle 4. The slits 17 are narrow toward the top of the body 12 and gradually open as the slit 17 nears the roof 2. The slit openings 23 are spaced equally from the center plane at the slit top 19 and the slit bottom 10. The distance from the slit opening 23 to the center plane can change from the slit top to the slit bottom 21. Center bump section 25 is disposed between slits 17. As previously described, the center bump section 25 can define an arc when viewed in cross-section from the top.

Figure 4:
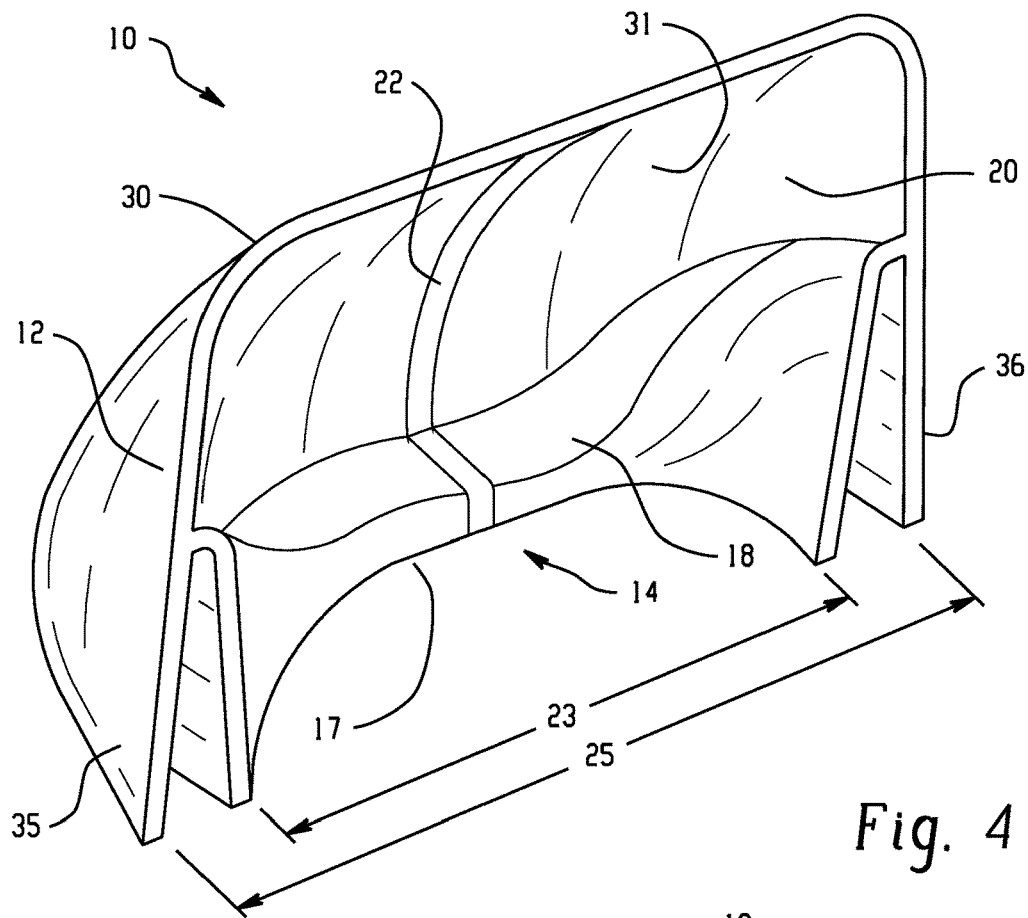
FIG. 4 is a back view of another embodiment of the drag-reducing aerodynamic system of FIG. 1.
Figure 5:
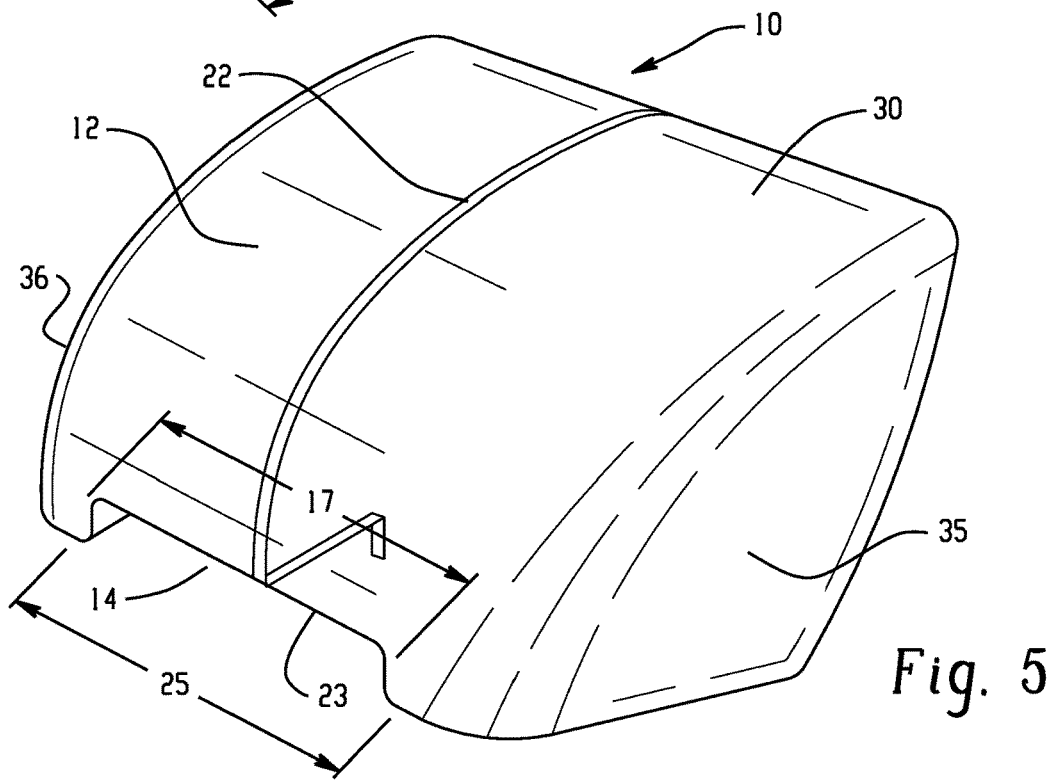
FIG. 5 is a front view of another embodiment of the drag-reducing aerodynamic system of FIG. 1.

FIGS. 4 and 5 illustrate a drag-reducing aerodynamic vehicle system 10 including an air inlet 14 including slit 17 extending along the length of the center bump section 25. FIG. 4 shows a back view of the drag-reducing aerodynamic vehicle system 10 and FIG. 5 shows a front view of the drag-reducing aerodynamic vehicle system 10. In FIG. 4, a center point 22 of the drag-reducing aerodynamic vehicle system 10 shows that the portions on either side of the center point 22 of the drag-reducing aerodynamic vehicle system 10 are mirror images of one another. The slit 17 includes air guide boss 18 extending from an interior surface 20 of the body 12. The slit 17 can extend a length all or part of the way from a first end 35 to a second end 36 of the fairing 12. The slit 17 can include a slit opening 23 that can have a constant width across the length of the slit 17 or a varying width across the length of the slit 17. The slit 17 can have a shape corresponding to that of the center bump section 25. The center bump section 25 can define an arc when view in cross-section from the top.

Turning now to FIG. 5, the front 30 of the fairing 12 is shown. As can be seen in FIG. 5, a center point 22 of the drag-reducing aerodynamic vehicle system 10 shows that the portions on either side of the center point 22 of the drag-reducing aerodynamic vehicle system 10 are mirror images of one another. The slit 17 can extend all or partially from a first end 35 to a second end 36 of fairing 12. The slit 17 can extend along the length of the center bump section 25. The slit 17 includes slit opening 23 having a constant width or a varying width across the length of the body 12. The slit 17 can be narrow toward the first end 35 or the second end 36 of the fairing 12 and can gradually open or can remain constant as the slit 17 nears the roof 2. The fairing 12 can have a curvilinear shape when viewed from the side and the slit 17 can conform to the curvilinear forward surface of the body 12.

Figure 6:
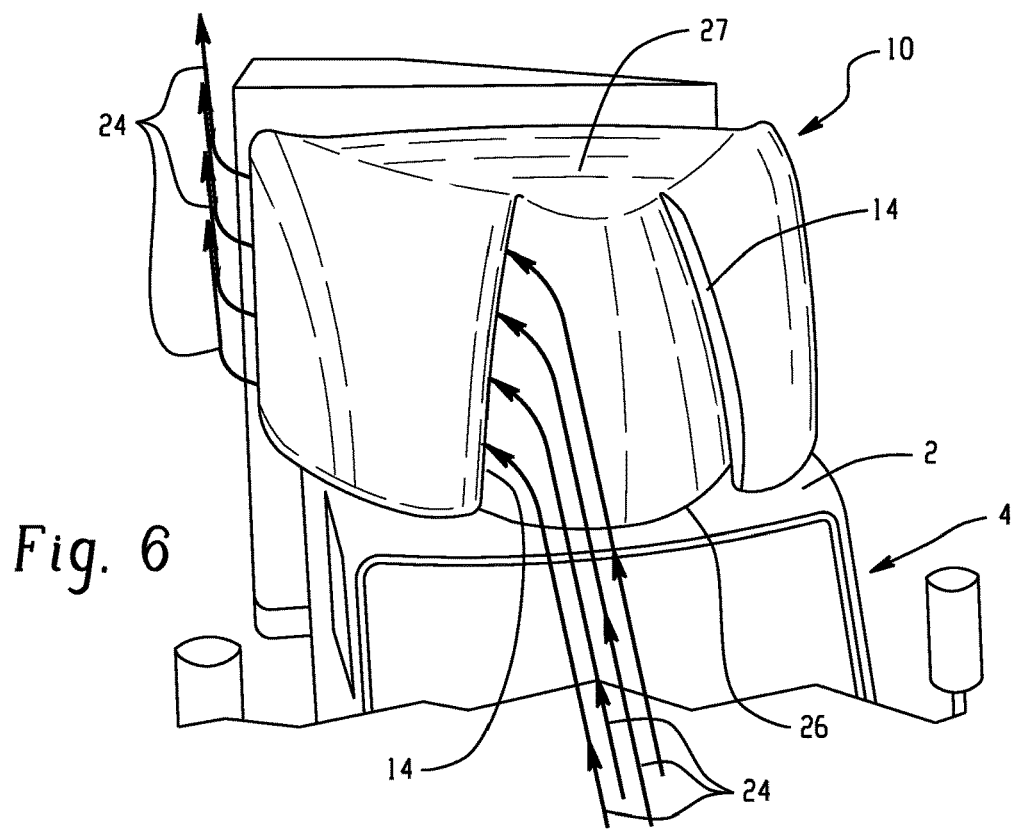
FIG. 6 is a view of the airflow flowing through the drag-reducing aerodynamic system of FIG. 1.

As shown in FIG. 6, the drag-reducing aerodynamic vehicle system 10 attached to roof 2 of vehicle 4 can adjust the air flow vectors 24 around the vehicle 4. For example, air can enter inlet 14 and exit through the outlet 15 and move toward the side and rear of the vehicle 4, thereby reducing the drag experienced by the vehicle 4. The air guide boss 18 on the drag-reducing aerodynamic vehicle system 10 can adjust an air stagnation point away from the vehicle windshield 6 to reduce air pressure and drag on the vehicle 2. The air guide boss 18 can take the air and create accelerated air flow by reducing the distance between the air guide boss 18 and the front 30 of the fairing 12. The accelerated air flow allows the gap between the cab 8 and the trailer 9 to be bridged, therefore preventing the air to recirculate in between, which would increase drag.

Figure 7:
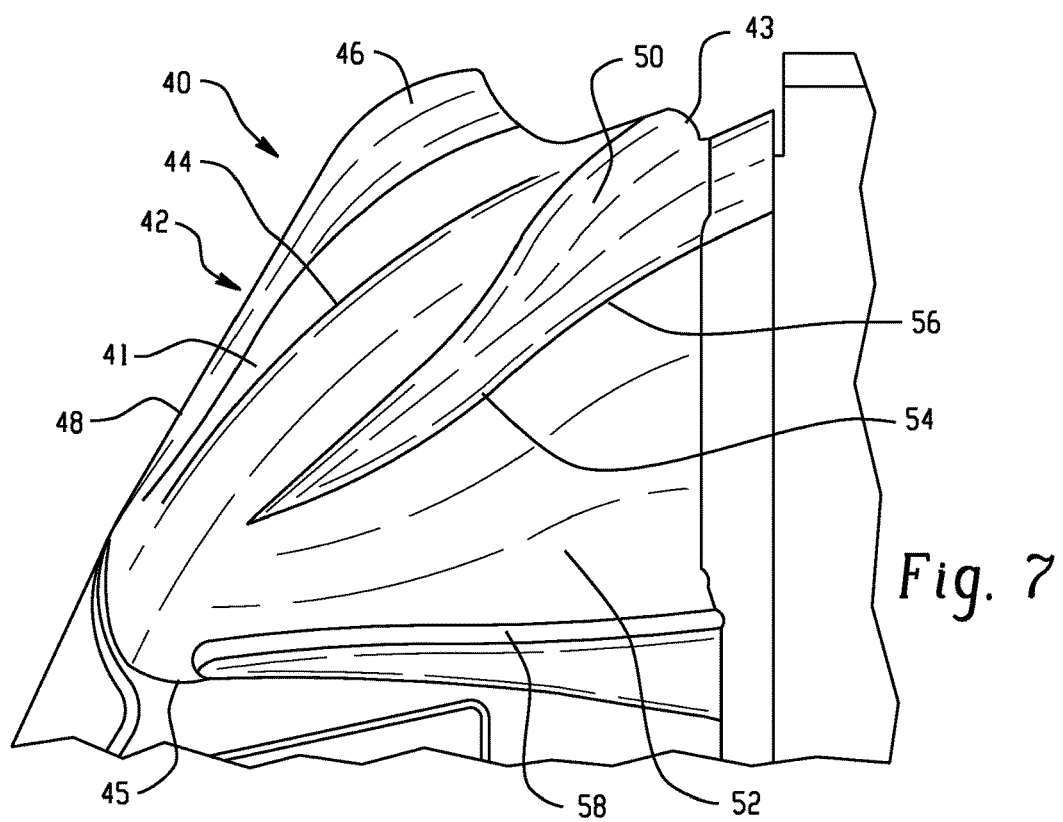
FIG. 7 is a side view of another drag-reducing aerodynamic system.

Turning now to FIG. 7, a drag-reducing aerodynamic vehicle system 40 is shown. The drag-reducing aerodynamic vehicle system 40 includes a body 41 with a center piece 42 protruding from a roof 2 of a vehicle 4. The center piece can comprise a base 44 having a wider section 46 further from a vehicle windshield 6. The base 44 can converge toward a narrower section 48 proximate to the vehicle windshield 6. Top surface channels 50 can be formed along the base 44 of the center piece 42, where the center piece 42 protrudes upward from the top surface channels 50. Side surface channels 52 can be formed by a raised edge 54 of a portion of a planar face 56 of the top surface channels 50 and a ledge 58. The side surface channels 52 can form indentations on the fairing 41 of the drag-reducing aerodynamic vehicle system 40. The ledge 58 can extend from another portion of the planar face 56 of the top surface channels 50. The top surface channels 50 can be disposed lateral to one another on opposing sides of the lengthwise centerline of the vehicle 4. The top surface channels 50 can be mirror images of one another with respect to a center plane, perpendicular to the road surface, bisecting the vehicle along its length. The side surface channels 52 can be disposed lateral to one another on opposing sides of the lengthwise centerline of the vehicle 4. The side surface channels 52 can be mirror images of one another with respect to a center plane, perpendicular to the road surface, bisecting the vehicle along its length.

The top surface channels 50 can be narrow at the bottom 45 of the fairing 41 and can gradually expand as the top surface channels 50 near the top 43 of the fairing 41. Similarly, the center piece 42 of the fairing 41 can be narrow at the bottom 45 of the fairing 41 and can gradually expand as the center piece 42 nears the top 43 of the fairing 41. The channels can define a wedge shape, narrower at the bottom, wider at the top that curves as it extends from the bottom 45 to the top 43 of the fairing 41, with the wedge shape being partially open to a front of the vehicle 4 and partially open to a center plane of the vehicle 4. Air directing and air fragmenting channels are formed by the top surface channels 50 and the side surface channels 52 such that when air flows toward the vehicle, the air flow is directed and fragmented between the top surface channels 50 and the side surface channels 52 to reduce drag forces occurring on the vehicle.

FIGS. 8 through 14 illustrate a drag-reducing aerodynamic vehicle system 70. As shown in FIG. 8, the drag-reducing aerodynamic vehicle system 70 can include a central fairing 72 extending from a roof 2 of a vehicle 4 and side fairings 74 disposed on either exterior end surface 76 of the central fairing 72. The side fairings 74 can be disposed lateral to one another on opposing sides of the central fairing 72. The side fairings 74 can be mirror images of one another with respect to a center plane, perpendicular to the road surface, bisecting the vehicle along its length. The side fairings 74 can include airflow guide vanes 78 (also referred to herein as louvers) protruding from an interior surface 80 (FIG. 11) of the side fairings 74. The air flow guide vanes 78 can be contained in a box like structure. The air flow guide vanes 78 can be individually attached to the side fairings 74 and the central fairing 72. The side fairings 74 can include foot 75 extending toward the central fairing 72 and the vehicle windshield 6 wherein the foot 75 includes a narrower section nearer the vehicle windshield and a wider section as it nears the louvers 78. The foot can extend all or a portion of the length of the central fairing 72.

Turning now to FIG. 9, central fairing 72 is shown as including pedestal 90 located along a bisection of the vehicle 4 where the pedestal 90 is oriented perpendicular to the road surface. Louvers 78 can attach to an exterior end surface 76 of the central fairing 72. The louvers 78 can be parallel a horizontal surface, or can have a rake with respect to the length of the vehicle. The louvers 78 can have a compound rake, with respect to a length and a width of the vehicle 4. As shown in FIG. 9, the exterior end surfaces 76 of the central fairing 72 converge toward a pedestal 90 of the central fairing 72, where the pedestal 90 is located at a centerline of the central fairing 72. The pedestal 90 can have a convex shape.

Figure 10:
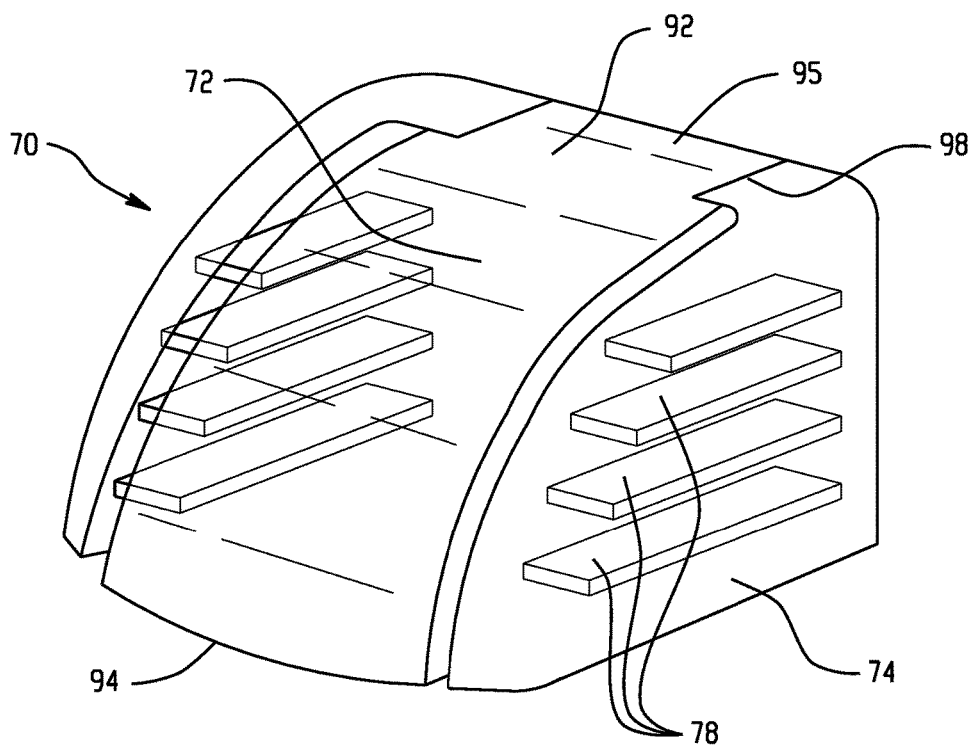
FIG. 10 is an isometric view of the drag-reducing aerodynamic system of FIG. 8.

FIG. 10 shows a drag-reducing aerodynamic vehicle system 70 can include a central fairing 72 extending from a roof 2 of a vehicle 4 and side fairings 74 disposed on either exterior end surface 76 of the central fairing 72. The side fairings 74 can be disposed lateral to one another on opposing sides of the central fairing 72. The side fairings 74 can be mirror images of one another with respect to a center plane, perpendicular to the road surface, bisecting the vehicle along its length. The side fairings 74 can include louvers 78 protruding from an interior surface 80 (FIG. 11) of the side fairings 74. The central fairing 72 can include a narrower section at its bottom 92 located proximate to the roof 2 that gradually increases in width as the central fairing nears the top 94 but narrows again upon reaching jut 95. Jut 95 includes indents 98 that conform to bump outs 97 on side fairings 74 (see FIG. 11). The central fairing 72 can define a wedge shape being narrower at the bottom and wider at the top where the central fairing curves as it extends from the bottom 94 to the top 92 with the wedge shape being partially open to a back of the vehicle 4 and partially open to a center plane of the vehicle 4.

Figure 11:
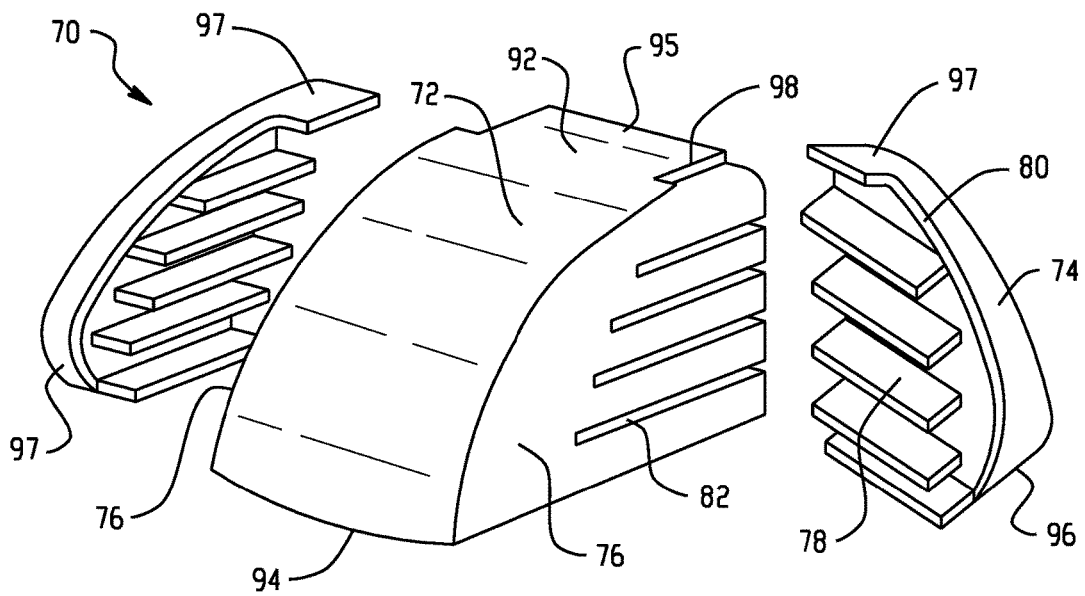
FIG. 11 is an exploded view of the drag-reducing aerodynamic system of FIG. 8.

FIG. 11 demonstrates that the airflow guide vanes 78 can slide into corresponding recesses 80 disposed on the exterior end surfaces 76 of the central fairing 72. The airflow guide vanes 78 can extend angularly from the interior surface 80 of the side fairings 74. The angle can be 0° to 90°. The louvers 78 can be parallel a horizontal surface, or can have a rake with respect to the length of the vehicle. The louvers 78 can have a compound rake, with respect to a length and a width of the vehicle 4. The louvers 78 can be attached to the recesses 80 via mechanical attachments, e.g., hooks, screws, snap-fit, etc.; chemical attachments, e.g., adhesives; or a combination of mechanical attachments and chemical attachments. The airflow guide vanes 78 can be mechanically attached to the recesses 80. The airflow guide vanes 78 can be chemically attached to the recesses 80. The airflow guide vanes 78 can be mechanically and chemically attached to the recesses 80. The side fairings 74 can extend at a rake from front section 96 to bump out 97 with the louvers 78 arranged stepwise in side fairings 74 such that each successive louver 78 from bump out 97 to front section 96 is larger than the louver 78 preceding it. Bump out 97 and indent 98 are configured to correspondingly mate with one another to form the drag-reducing vehicle system 70.

Figure 12:
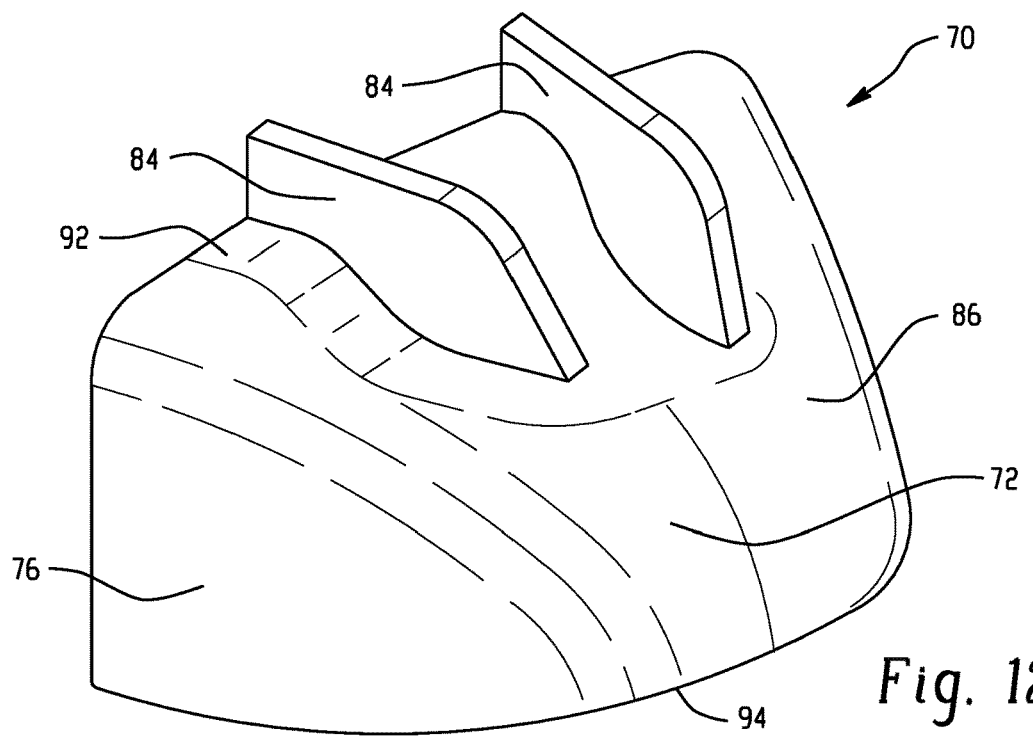
FIG. 12 is a view of the central fairing of a drag-reducing aerodynamic system similar to that shown in FIG. 8.

Turning now to FIG. 12, the central fairing 72 is shown as having optional support vanes 84 extending from an air facing surface 86 of the central fairing 72. drag-reducing aerodynamic vehicle system 70 can include a central fairing 72 extending from a roof 2 of a vehicle 4 and side fairings 74 disposed on either exterior end surface 76 of the central fairing 72. The side fairings 74 can be disposed lateral to one another on opposing sides of the central fairing 72. The side fairings 74 can be mirror images of one another with respect to a center plane, perpendicular to the road surface, bisecting the vehicle along its length. The central fairing 72 can include a narrower section at its bottom 92 located proximate to the roof 2 that gradually increases in width as the central fairing nears the top 94. The central fairing 72 can define a wedge shape being narrower at the bottom and wider at the top where the central fairing curves as it extends from the bottom 94 to the top 92 with the wedge shape being partially open to a back of the vehicle 4 and partially open to a center plane of the vehicle 4.

Central fairing 72 is shown as including pedestal 90 located along a bisection of the vehicle 4 where the pedestal 90 is oriented perpendicular to the road surface in FIG. 13. Louvers 78 can attach to an exterior end surface 76 of the central fairing 72. The louvers 78 can be parallel a horizontal surface, or can have a rake with respect to the length of the vehicle. The louvers 78 can have a compound rake, with respect to a length and a width of the vehicle 4. As shown in FIG. 13, the exterior end surfaces 76 of the central fairing 72 converge toward a pedestal 90 of the central fairing 72, where the pedestal 90 is located at a centerline of the central fairing 72. The pedestal 90 can have a convex shape. The side fairings 74 can each include a bridge 88 suspended over the central fairing 72, wherein an interior surface of the bridge 88 can attach to the support vanes 84 of the central fairing 72.

Figure 14:
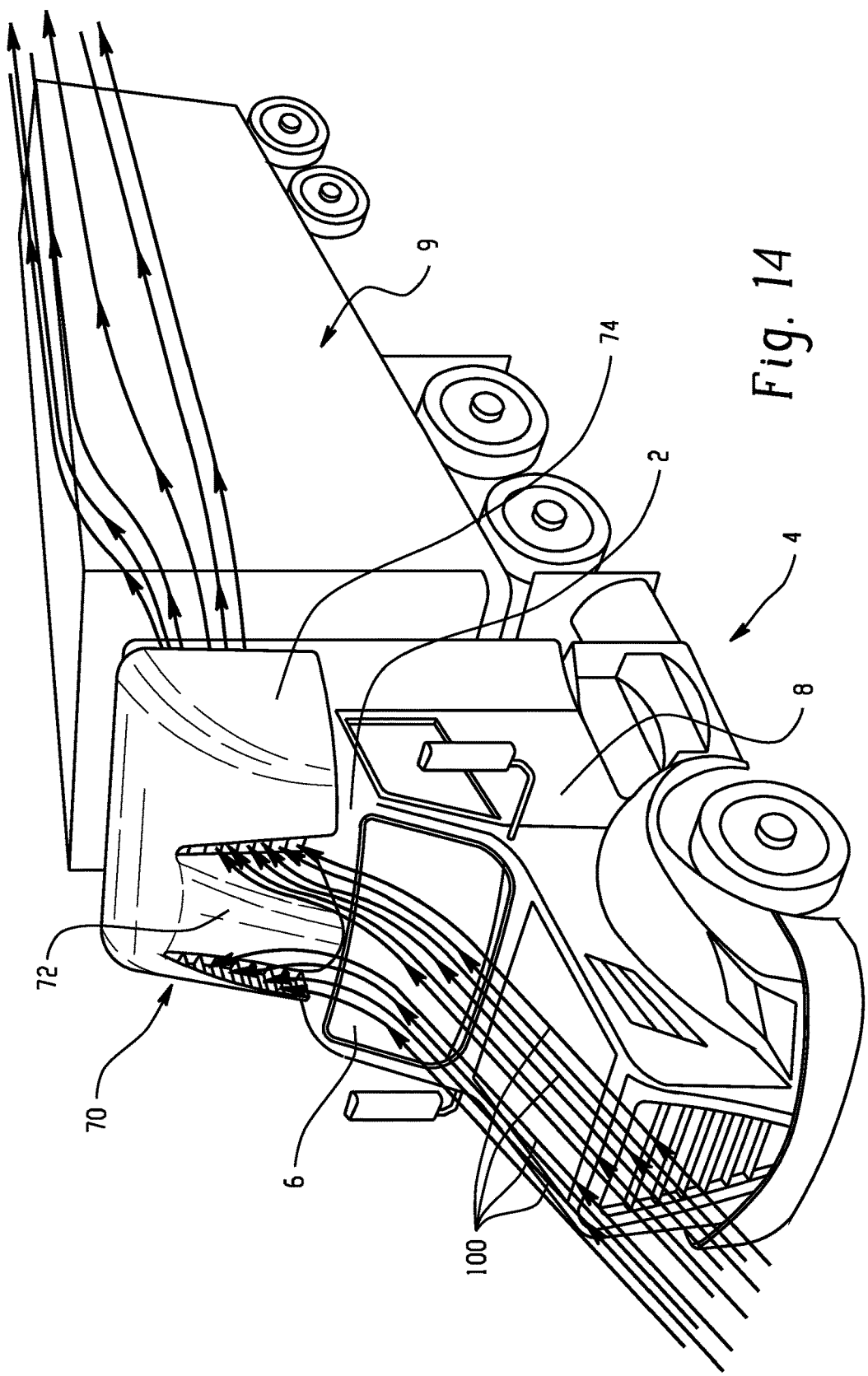
FIG. 14 is a view of the airflow flowing through the drag-reducing aerodynamic system of FIG. 8.

As shown in FIG. 14, the drag-reducing aerodynamic vehicle system 70 attached to roof 2 of vehicle 4 can adjust the air flow vectors 100 around the vehicle 4. For example, air can enter louvers 78 and exit through a rear of the drag-reducing aerodynamic vehicle system 70 and moves the side and rear of the vehicle 4, thereby reducing the drag experienced by the vehicle 4. The louvers 78 on the drag-reducing aerodynamic vehicle system 70 can adjust an air stagnation point away from the vehicle windshield 6 to reduce air pressure and drag on the vehicle 2. The accelerated air flow allows the gap between the cab 8 and the trailer 9 to be bridged, therefore preventing the air to recirculate in between, which would increase drag.

Figure 19:
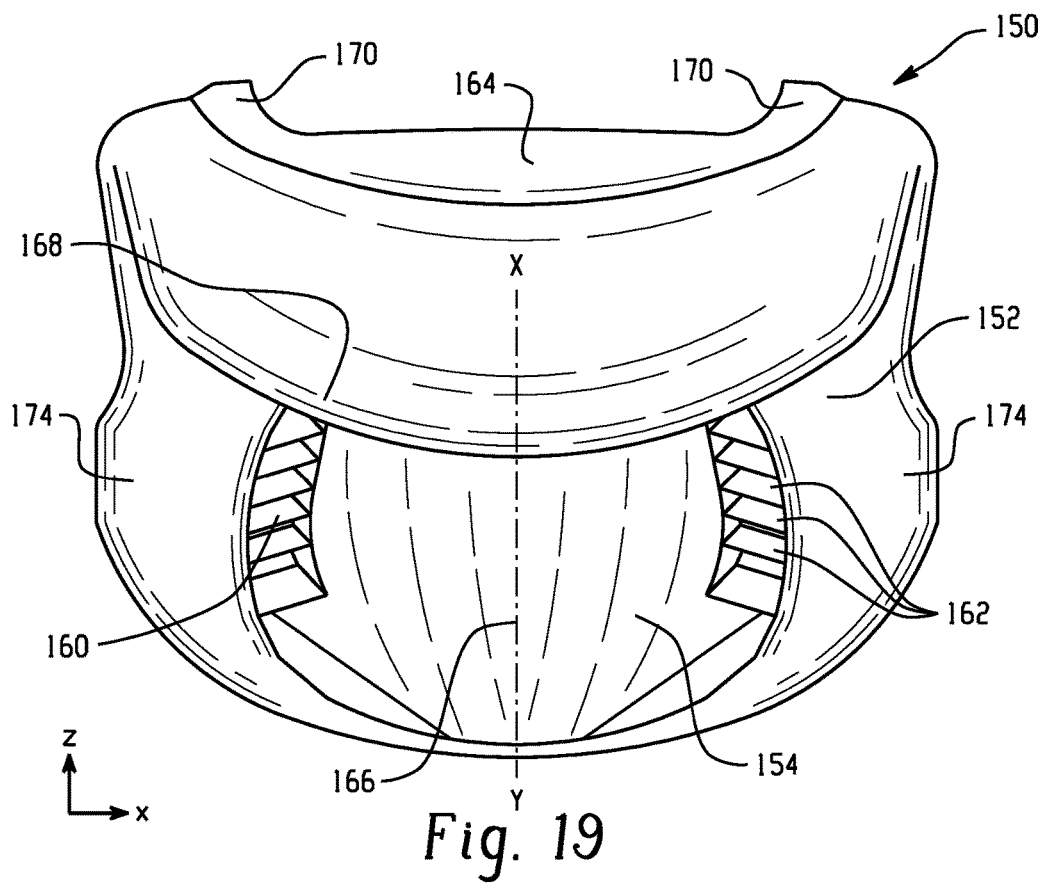
FIG. 19 is a top view of a drag-reducing aerodynamic system.
Figure 20:
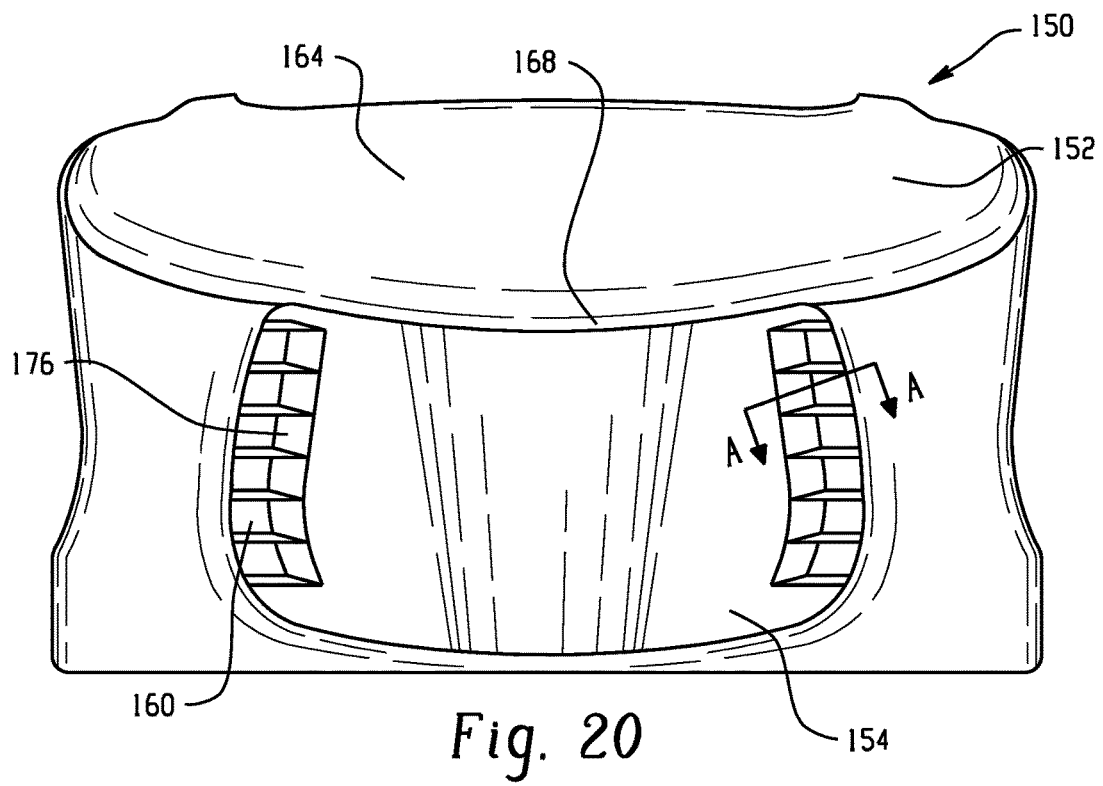
FIG. 20 is a front view of the drag-reducing aerodynamic system of FIG. 19.
Figure 21:
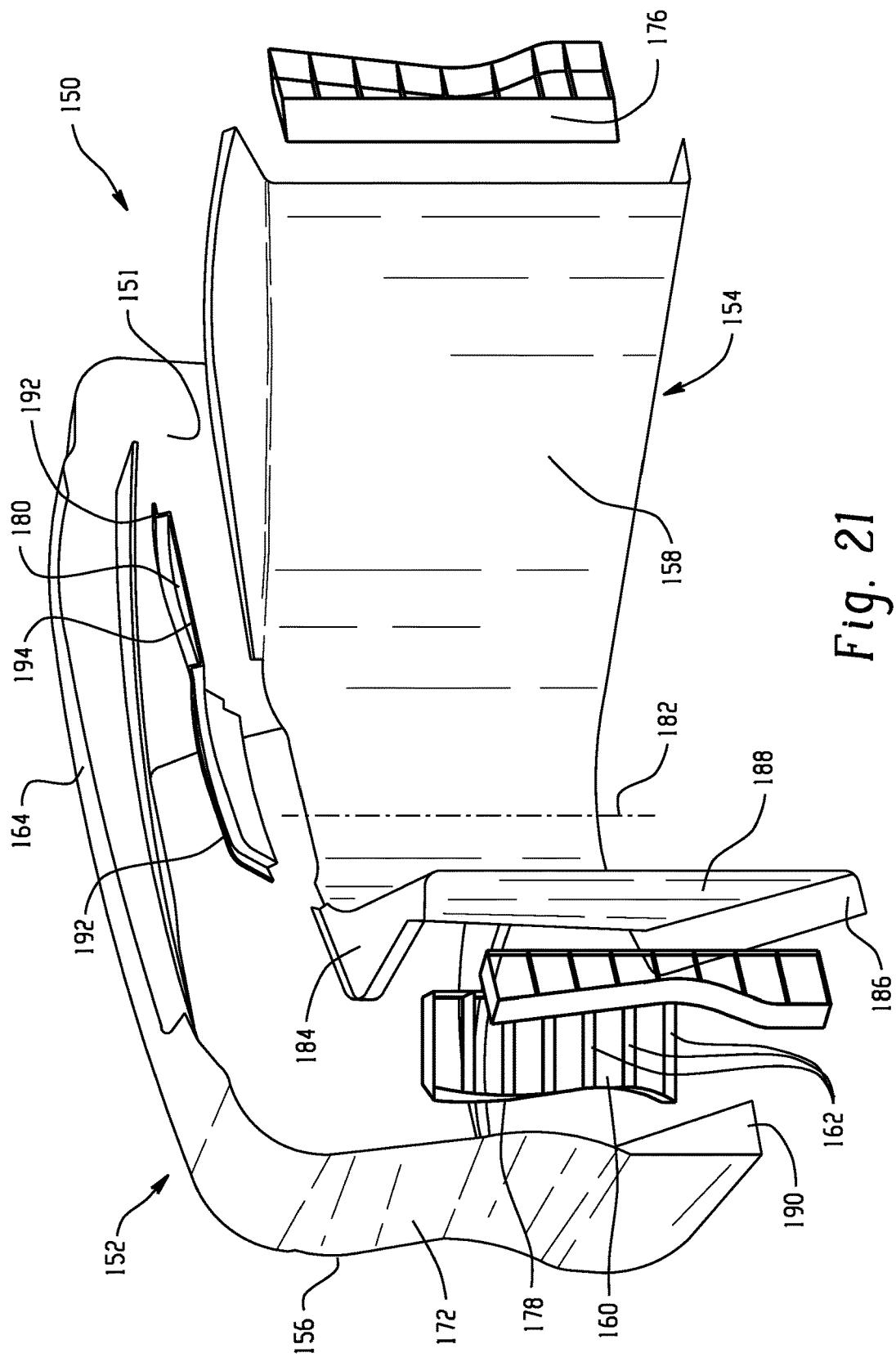
FIG. 21 is an exploded view of the drag-reducing aerodynamic system of FIG. 19.

FIGS. 19-26 show a drag-reducing aerodynamic vehicle system 150. FIGS. 19 and 21 show that the drag-reducing aerodynamic vehicle system 150 includes a frontal member 152 including an outer casing 156. The system 150 can include a rear member 154 including an inner casing 158. FIG. 19 is a top view of the drag-reducing aerodynamic vehicle system 150. As can be seen in FIG. 19, frontal member 152 and rear member 154 can form drag-reducing aerodynamic vehicle system 150. Frontal member 152 can include fin boxes 160 with airflow guide vanes 162 dispersed within the fin boxes 160. The airflow guide vanes 162 can be parallel a horizontal surface (i.e., the X-Z plane illustrated in FIG. 19). The airflow guide vanes 162 can have a rake or pitch with respect to the length of the vehicle. The airflow guide vanes 162 can have a compound rake, with respect to a length and a width of the vehicle, in which a first portion has a first rake, and a second portion has a second rake other than the first rake. The fin boxes 160 can be integrally formed with the outer casing 156, such as part of a monolithic part. The fin boxes 160 can be formed separately from the outer casing 156 and attached thereto subsequently. Joints include adhesive, welds, snaps, press-fits and the like. The fin boxes 160 can protrude from an inside surface of the outer casing 156. As shown in FIG. 19, the frontal member 152 can include a cap 164 that can be arcuate in shape converging toward a centerline 166 of the drag-reducing aerodynamic vehicle system 150. Side portions on either side of the X-Y plane of the cap 164 can be mirror images of each other. The cap 164 can include a lip 168 overhanging a portion of the rear member 154. The cap 164 can include protrusions 170 extending upward from the cap 164 to direct air other than that captured by airflow guide vanes 162 behind the vehicle. This can further shape the airstream, and can assist in reducing drag. A base frontal section 172 can extend vertically downward from the cap 164 and can include an arcuate shape. Base frontal section 172 can include protuberance 174 (e.g., a protrusion) located on either side of the centerline 166 wherein the protuberance 174 converges toward the centerline 166 with a decreasing width.

FIG. 20 is a front view of the drag-reducing aerodynamic vehicle system 150 of FIG. 19. FIG. 20 shows cap 164 of frontal member 154 with lip 168 extending over rear member 154. Fin boxes 160 are shown with a sidewall 176 attached to rear member 154. Fin boxes 160 can be joined to the rear member 154 such as with a weld, adhesive, or fasteners (e.g., screws).

FIG. 21 is an exploded view of the drag-reducing aerodynamic vehicle system 150 of FIG. 19. FIG. 21 shows that frontal member 152 includes outer casing 156 and fin boxes 160. Outer casing 156 can include cap 164 and base frontal section 172. Fin boxes 160 can include air flow guide vanes 162 disposed between sidewalls 176, 178, wherein a sidewall of fin boxes 160 is configured to correspondingly mate with inner casing 158 of rear member 154. The number of fin boxes 160 is not limited and can be any number that will provide the desired aerodynamic features to the drag-reducing aerodynamic vehicle system 150. For example, there can be greater than or equal to two fin boxes 160 can be present on the outer casing 156. For example, there can be greater than or equal to three fin boxes 160 on the outer casing 156. For example, there can be greater than or equal to four fin boxes 160 on the outer casing 156. One sidewall 176 can have a relative straight cross-sectional area to correspond with the shape of the inner casing 158 to which it will be mated, while curved sidewall 178 can have a curved cross-sectional area to correspond with the shape of the base frontal section 172 to which it will be mated. With the curved sidewall 178, airflow guide vanes 162 can vary in length from sidewall 176 to curved sidewall 178. The length of airflow guide vanes 162 can vary depending upon whether the fin boxes 160 are attached to the frontal member 152 or to the frontal member 152 and the rear member 154.

As shown in FIG. 21, rear member 154 can include inner casing 158 and top 180. Inner casing 158 and top 180 are configured to mate with outer casing 156 of frontal member 152. Inner casing 158 can include an arcuate structure converging toward a midpoint 182 of rear member 154. The portions of the inner casing 158 located on either side of midpoint 182 can be mirror images of one another. Inner casing 158 can include an inner casing top ledge 184 and an inner casing bottom ledge 186 connected by an inner casing main wall 188 where inner casing top ledge 184 and inner casing bottom ledge 186 protrude horizontally (e.g., perpendicularly to the ground). Inner casing top ledge 184 and inner casing bottom ledge 186 can be formed such that they correspondingly mate with cap 164 and outer casing under portion 190. Inner casing main wall 188 can be configured to accept sidewall 176 of fin box 160. The outer casing 156 can include longitudinal bonded ribs. The outer casing 156 can include transverse bonded ribs. The outer casing 156 can include longitudinal bonded ribs and transverse bonded ribs. Rear member 154 of drag-reducing aerodynamic vehicle system 150 can include a top 180. Top 180 can be formed integrally with inner casing 158. Top 180 can be formed separately from inner casing 158. Top 180 can include corrugated edges 192 connected by top middle portion 194. When not formed integrally with inner casing 158, top 180 can be attached to inner casing 158 by mechanical attachment, chemical attachment, or a combination comprising at least one of the foregoing.

Figure 22:
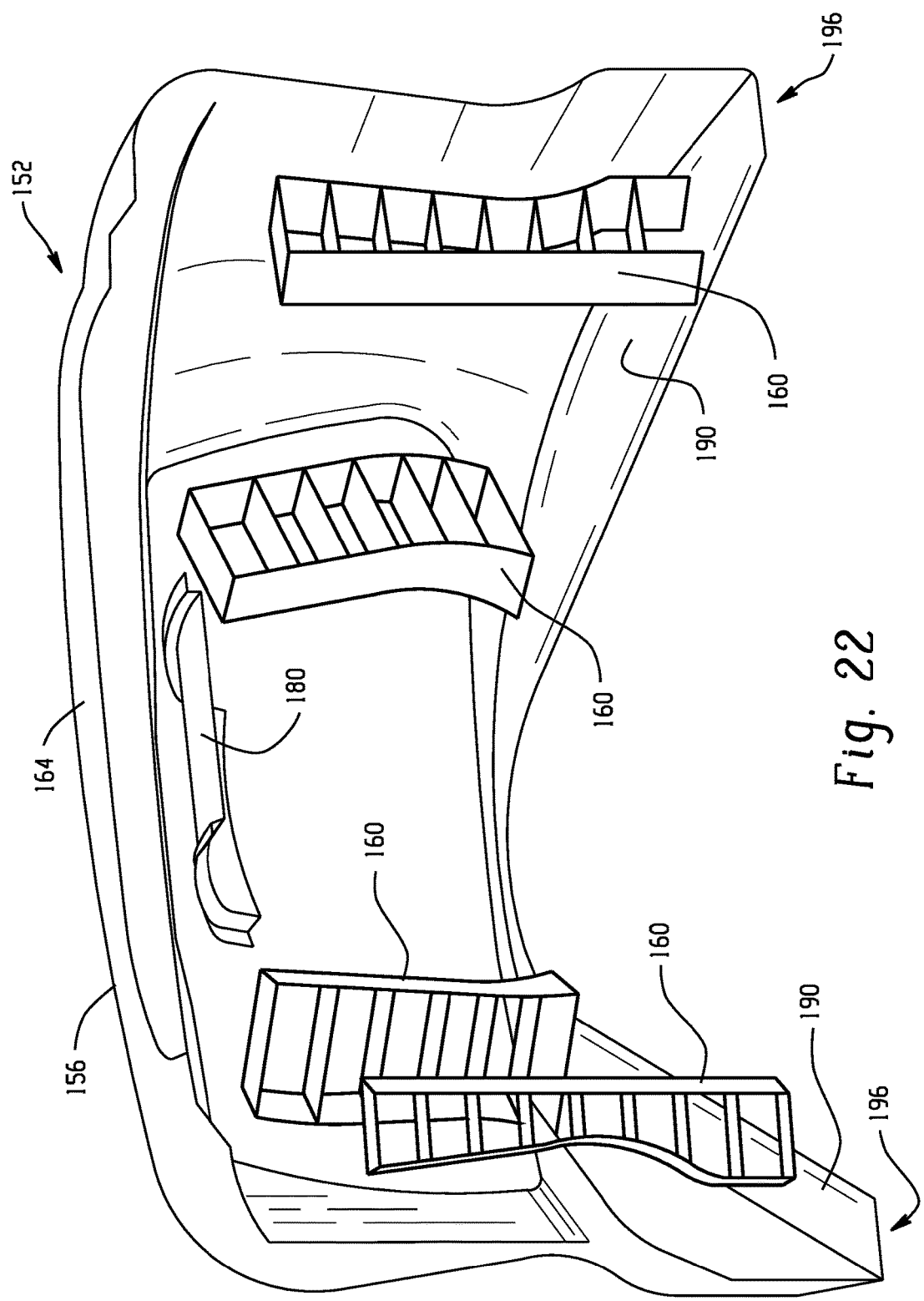
FIG. 22 is a rear view of the assembly of the outer members of the drag-reducing aerodynamic system of FIG. 19.

Turning now to FIG. 22, assembly of the fin boxes 160 to the outer casing 156 is illustrated. As can be seen in FIG. 22, four fin boxes 160 can be included on the outer casing 156. Two fin boxes 160 can be located toward a centerline 166 (see FIG. 19) of the frontal member 152. Two fin boxes 160 can be located toward a back section 196 of the frontal member 152. Airflow guide vanes 162 can be in mechanical communication with the outer casing under portion 190 such that at least a portion of bottom air flow guide vane 162 present on fin box 160 can rest on outer casing under portion 190. Fin boxes 160 can be attached to outer casing 158 via mechanical attachments (e.g., screws). Fin boxes 160 can be attached to outer casing 158 via chemical attachments (e.g., adhesives). Fin boxes 160 can be attached to outer casing 158 via mechanical attachments and chemical attachments. Top 180 of inner casing 158 can be attached to lip 168 of cap 164. Top 180 can be attached to outer casing 158 via mechanical attachments, chemical attachments, or a combination comprising at least one of the foregoing.

Figure 23:
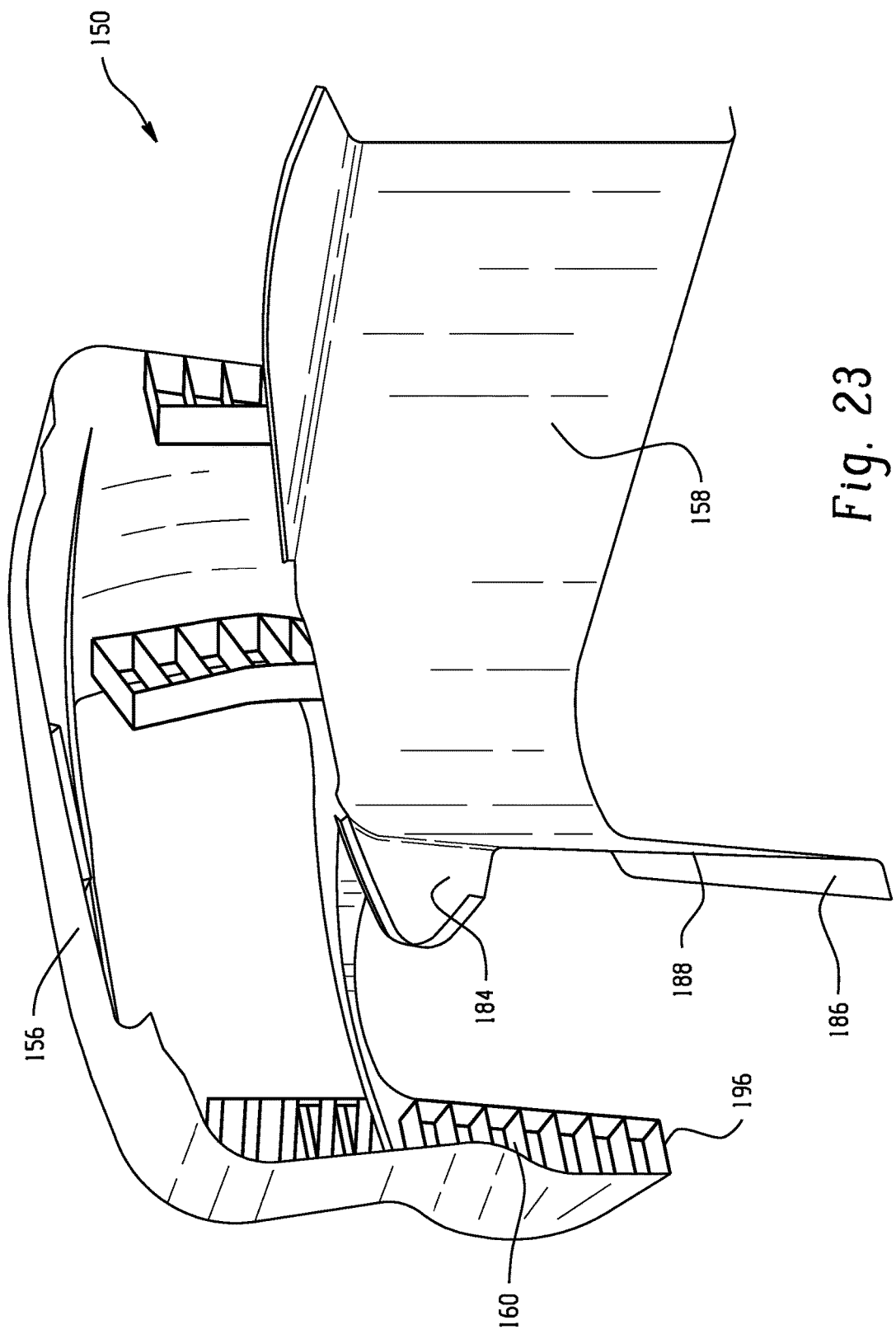
FIG. 23 is a rear view of the assembly of the outer and inner members of the drag-reducing aerodynamic system of FIG. 19.

FIG. 23 shows the assembly of the inner casing 158 to outer casing 156. As can be seen in FIG. 23, inner casing 158 can include inner casing top ledge 184 and inner casing bottom ledge 186 connected by inner casing main wall 188. Fin boxes 160 located toward the back section 196 of frontal member 152 can fit in the space between inner casing top ledge 184 and inner casing bottom ledge 186 when inner casing 158 and outer casing 156 are attached to one another. Inner casing 158 and outer casing 156 can be attached via mechanical attachments, chemical attachments, or a combination comprising at least one of the foregoing.

Figure 24:
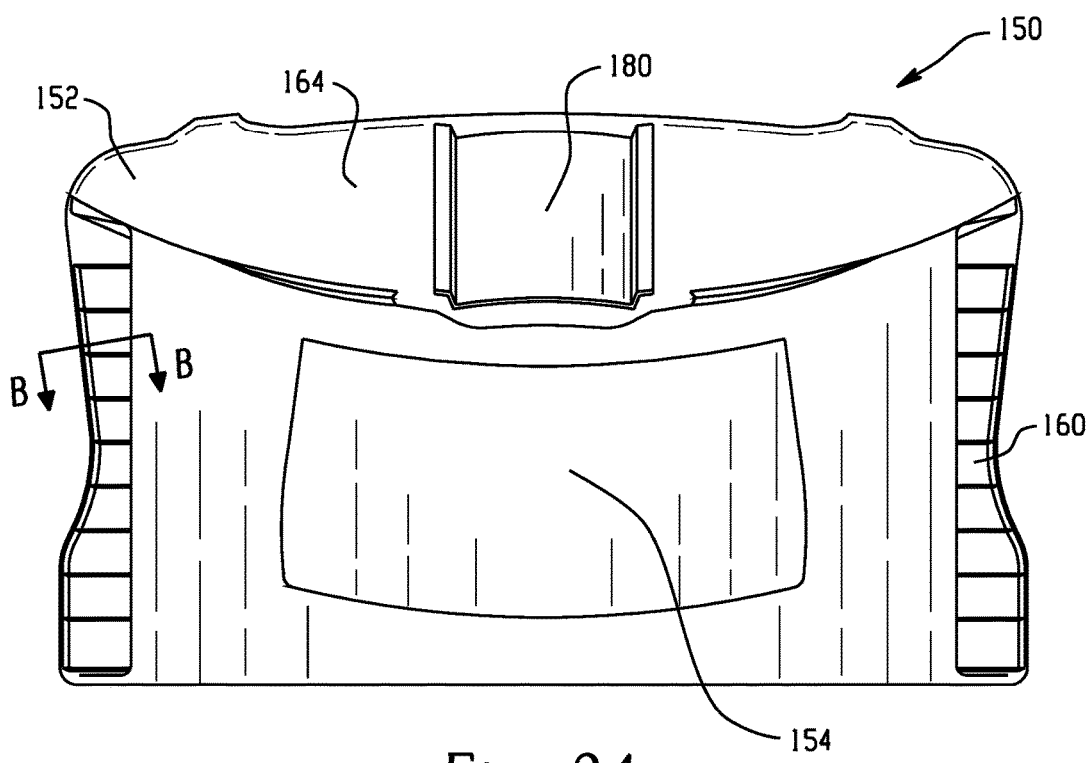
FIG. 24 is a rear view of the drag-reducing aerodynamic system of FIG. 19.

FIG. 24 is an assembled rear view of drag-reducing aerodynamic vehicle system 150. As seen in FIG. 24, top 180 of rear member 154 can fit into a corresponding opening 198 in cap 164 of frontal member 152. The area between the top 180 and the outer casing 156 can include a gap. The top 180 can add stiffness to the outer casing 156. Top 180 can be attached to frontal member 152 (e.g., outer casing 156) via mechanical attachment (e.g., snap fit, screw, tongue and groove, etc.), chemical attachment (e.g., adhesive), or a combination comprising at least one of the foregoing.

Figure 25:
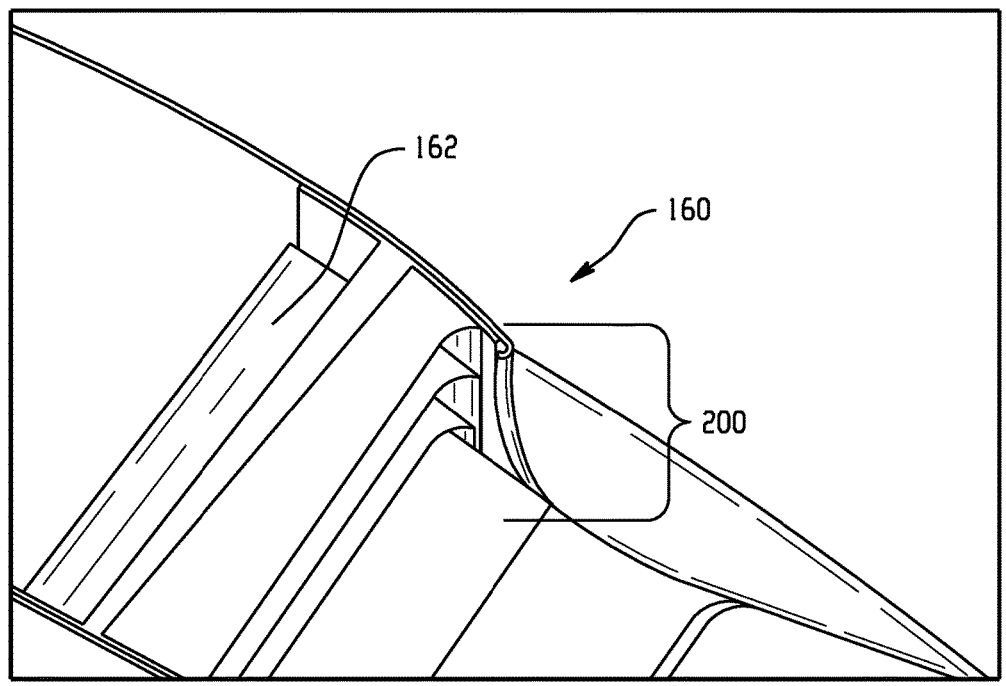
FIG. 25 is a sectional view of a front fin taken along section line A-A in FIG. 19.
Figure 26:
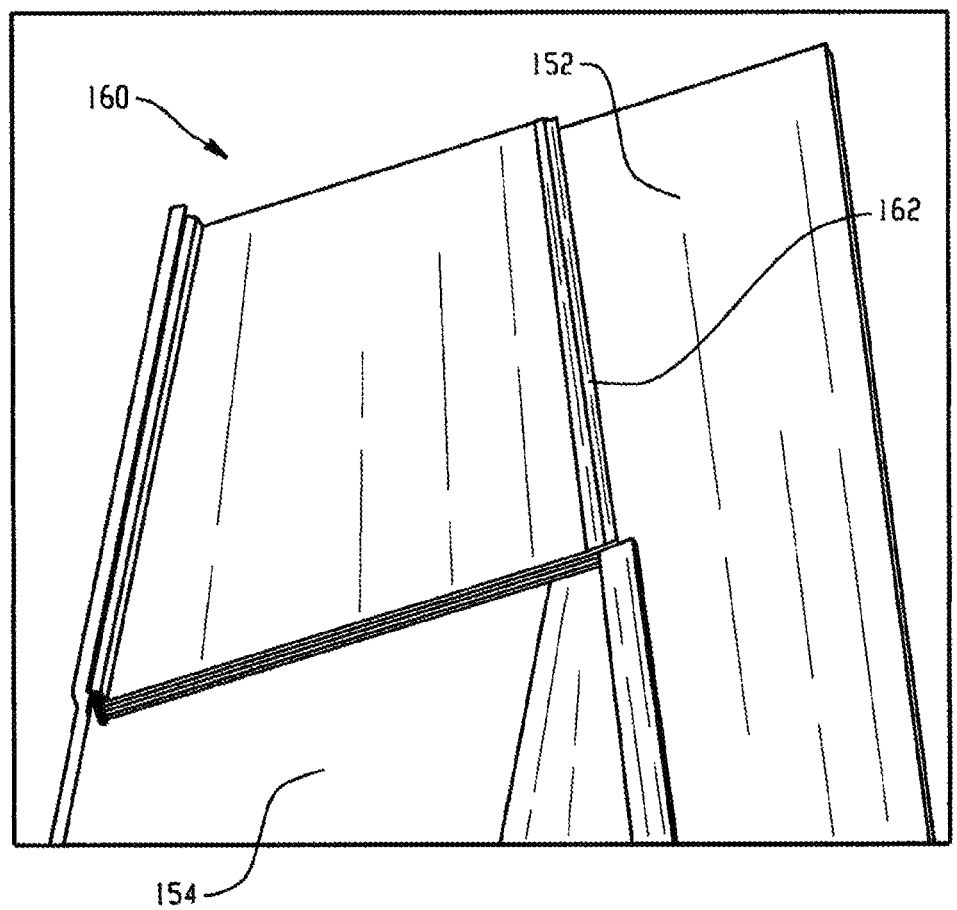
FIG. 26 is a sectional view of a rear fin taken along line B-B in FIG. 23.

FIG. 25 is a sectional view of the fin boxes 160 of frontal member 152 taken along line A-A in FIG. 20. The fin boxes 160 in FIG. 25 are those located closer to the centerline 166 of the drag-reducing aerodynamic vehicle system 150. As can be seen in FIG. 25, airflow guide vanes 162 can include a multilayer structure 200 that can include multiple layers (i.e., greater than 1) to form an airflow guide vane 162 in the fin boxes 160. Optionally, ribs can be present between the various layers of the multilayer structure to add strength and stiffness to the fin boxes 160. The optional ribs can be oriented horizontally, vertically, or diagonally. FIG. 26 is a sectional view of the fin boxes 160 of frontal member 152 taken along line B-B in FIG. 24. The fin boxes 160 in FIG. 26 are those located near the back section 196 of the frontal member 152.

Processes for making the drag-reducing aerodynamic systems disclosed herein are also contemplated. For example, various molding processes can be used to make the drag-reducing aerodynamic systems including, but not limited to, injection molding, thermoforming, compression molding, additive manufacturing, etc.

For example, the drag-reducing aerodynamic vehicle system 150 can be formed by injection molding the fin boxes 160. The outer casing 156 can be formed by thermoforming. The inner casing 158 can be formed by thermoforming. The top 180 can be formed by thermoforming. The top 180 can be formed integrally with the inner casing 158. The top 180 can be formed separately from the inner casing 158. The top 180 can be attached to the outer casing 156 with a mechanical attachment (e.g., snap fit, screw, tongue and groove, etc.). The top 180 can be attached to the outer casing 156 with a chemical attachment (e.g., adhesive). The top 180 can be attached to the outer casing 156 with a chemical attachment and a mechanical attachment. Stated another way, the inner casing 158 can be thermoformed and bonded to the outer casing 156, which can be thermoformed. In an additive manufacturing process, the outer casing, inner casing, and top can be merged and manufactured in a single pass, yielding an integral drag-reducing aerodynamic vehicle system.

In an additive manufacturing process, the outer casing, inner casing, and top can be formed by creating a digital blueprint of a desired solid object with computer-aided design (CAD) modeling software and then slicing that virtual blueprint into very small digital cross-sections. These cross-sections are formed or deposited in a sequential layering process in an AM machine to create the drag-reducing aerodynamic system.

The drag-reducing aerodynamic systems are further illustrated by the following non limiting examples. Unless otherwise specified, all examples were based upon simulations.

EXAMPLES

For all the examples, the baseline roof fairing is a Day Cab, which is a truck used for long haul without sleeping quarters. The truck includes a roof fairing and side air deflectors. The distance from the truck to the trailer is 45 inches. Computational Fluid Dynamics (CFD) simulations are used to access aerodynamic efficiency using Power-FLOW™ software with a turbulent flow regime and a steady speed of 65 mph (104.6 kph). Runs were performed at 0 degree yaw (i.e., lateral wind) and averaged with results at 6 degree yaw to obtain a yaw averaged drag coefficient, which can be translated to fuel economy by using the industry recognized standard previously described herein, i.e., that a 2:1 ratio can be used to approximate the relationship between yaw averaged drag and fuel consumption. Yaw as used herein refers to the angle of the vehicle with respect to the wind direction such that 0° yaw is frontal wind and 6° yaw includes a cross-wind vector.

Comparative Example 1

Figure 17:
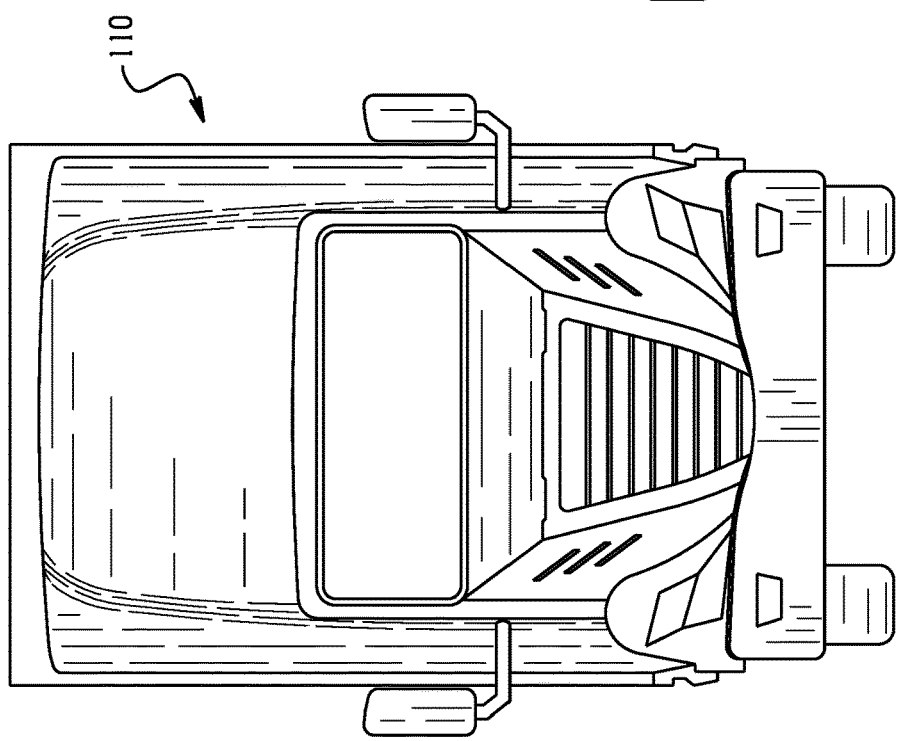
FIG. 17 is a front view of a baseline roof fairing containing side extenders.

In this example, a baseline truck without an aerodynamic package is compared to a baseline truck with a roof fairing (Comparative Sample 1, FIG. 18) and a baseline truck with a roof fairing and side extenders (Comparative Sample 2, FIG. 17). It is noted that design and aerodynamic functionality is material independent.

TABLE 1

Effect of Fairing and Side Extenders on Drag Reduction

| Sample # | Comparative Sample 1 (with fairing) | Comparative Sample 2 (with fairing and side extenders) |
|---|---|---|
| Drag reduction at 6° yaw | 20.3 | 35.7 |
| Drag reduction at 0° yaw | 36.2 | 38.4 |
| Average reduction in drag (%) | 27.6 | 36.9 |
| Estimated fuel savings based on drag (%) | 13.8 | 18.5 |

As can be seen in Table 1, improvements in the aero-shape can be significant with the use of a roof fairing since it can decrease stagnation at the front face of the trailer and can minimize the in-flows in the gap area.

Example 1

Figure 15:
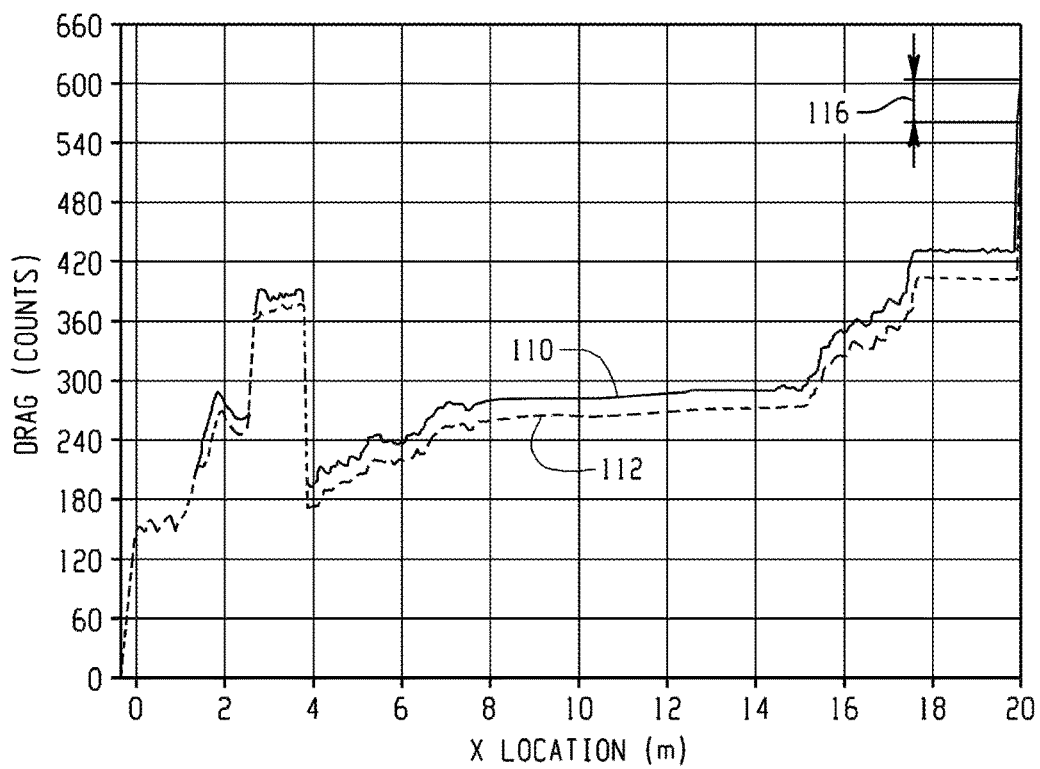
FIG. 15 is a graphical representation of the drag force accumulation along the length of the vehicle with the drag-reducing aerodynamic system of FIG. 8 compared to a baseline roof fairing.

A roof fairing having the design shown in FIGS. 8 to 14 is tested (Sample 1) and compared to a baseline roof fairing (Comparative Example 2) (see FIG. 17). Drag is measured in drag counts for each design and the results are shown in FIG. 15 with a drag development plot showing the drag force accumulation along the length of a vehicle. "Drag counts" equal 0.001 coefficient of drag ($C_D$). Total drag is equal to the sum of all drag forces on all parts of the vehicle, shown at the right side of FIG. 15, where X=20 meters (m). Reduction in cumulative drag at 6° yaw between the baseline and the optimized design is labelled 116 in FIG. 15 and is equal to 32 counts or 5.3%. Reduction in cumulative drag at 0° yaw between the baseline and the optimized design is equal to 4.4% for an overall reduction in drag of 4.9% as compared to a baseline roof fairing 110. Baseline roof fairing 110 has higher cumulative drag than the current roof fairing 112 as can be seen in FIG. 15. A 5.3% reduction in cumulative drag at 6° yaw is observed between roof fairing 110 and roof fairing 112, resulting in a 2.4% reduction in fuel usage according to the 2:1 relationship between delta drag and fuel usage. In this example, vehicle drag was modeled under two driving scenarios: no lateral wind (0° yaw) and lateral wind (6° yaw). The results were integrated to evaluate changes in fuel use under representative load conditions. These results demonstrate that Sample 1 outperformed the baseline roof fairing by redirecting air from the stagnation area and accelerating it past the tractor trailer gap. Variations of the design shown in FIGS. 8 to 14, e.g., number of vanes, angle of vanes, etc., can improve further upon the drag coefficient reductions and estimated fuel savings. For example, the yaw averaged drag coefficient reduction can be 5.9% as compared to the baseline roof fairing, while the estimated fuel savings can exceed 2.9% as compared to the baseline roof fairing.

Example 2

Figure 16:
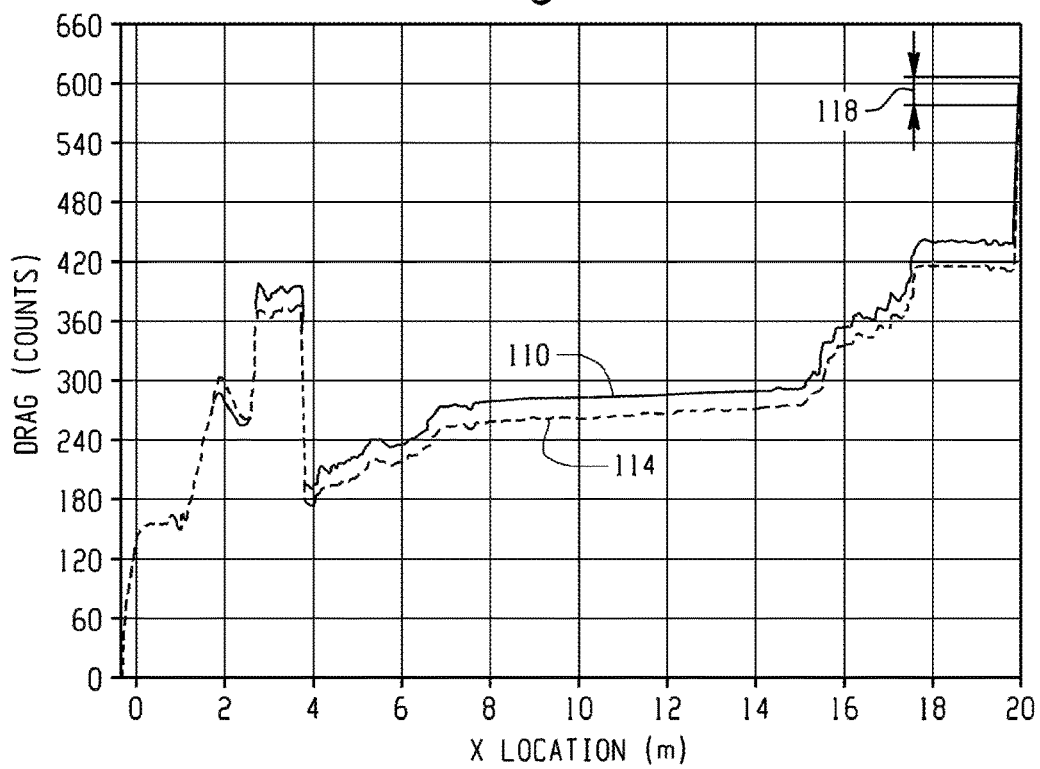
FIG. 16 is a graphical representation of the drag force accumulation along the length of the vehicle with the drag-reducing aerodynamic system of FIG. 7 compared to a baseline roof fairing.

A roof fairing having the design shown in FIG. 7 is tested and compared to a baseline roof fairing (see FIG. 17). Drag is measured in drag counts for each design and the results are shown in FIG. 16 with a drag development plot showing the drag force accumulation along the length of a vehicle. "Drag counts" equal 0.001 coefficient of drag ($C_D$). Total drag is equal to the sum of all drag forces on all parts of the vehicle, shown at the right side of FIG. 16, where X=20 meters (m). Reduction in cumulative drag between the baseline and the optimized design is labelled 116 in FIG. 16 and is equal to 32 counts or 3.8%. Baseline roof fairing 110 has higher cumulative drag than the current roof fairing 114 as can be seen in FIG. 16. A 3.8% reduction in cumulative drag is observed between roof fairing 110 and roof fairing 114, resulting in a 1.9% reduction in fuel usage according to the 2:1 relationship between delta drag and fuel usage. In this example, vehicle drag was modeled under two driving scenarios: no lateral wind (0° yaw) and lateral wind (6° yaw). The results were integrated to evaluate changes in fuel use under representative load conditions.

Example 3

In this example, a roof fairing as shown in FIGS. 8 to 14 was analyzed for structural behavior under typical road driving conditions (i.e., inertial loading at 5 grams and air pressure loads at 75 mph (104.6 kph). The material chosen for Sample 3 is a mineral filled polycarbonate/acrylonitrile butadiene styrene (PC/ABS) alloy (CYCOLOY™, commercially available from SABIC's Innovative Plastics business) with a Young's Modulus (E-modulus) of 4,400 MegaPascals (MPa), paintability, and high low temperature impact. The results of the analysis are shown in Table 2. Frequency is measured in Hertz (Hz). Highway loads were considered at 5 G's in the horizontal plane of the roof fairing and 3 G in the vertical plane of the roof fairing. Additional pressure loads were also tested.

TABLE 2

Results of Structural Analysis

| Metric | Units | Sample 3 |
|---|---|---|
| Natural Frequency | Hertz (Hz) | 15 |
| Highway Loads (5G in Plane, 3G Vertical) | | |
| Margin of Safety (yield) | Safety Factor of 1.25 | 7.3 |
| Margin of Safety (ultimate) | Safety Factor of 2.0 | 9.3 |
| With Additional Pressure Loads at 75 mph (104.6 kph) | | |
| Margin of Safety (yield) | Safety Factor of 1.25 | 5.3 |
| Margin of Safety (ultimate) | Safety Factor of 2.0 | 7.0 |

As can be seen from Table 2, the roof fairing meets the strength and stiffness requirements of commercial applications and does not exhibit modal flapping behavior typical of thin shelled fairings at low frequencies (below 13 Hertz). As a result, the roof fairing design shown in FIGS. 8 to 14, when comprised of a thermoplastic polymer can offer a 50% weight reduction compared to a commercial baseline roof fairing.

Example 4

Figure 27:
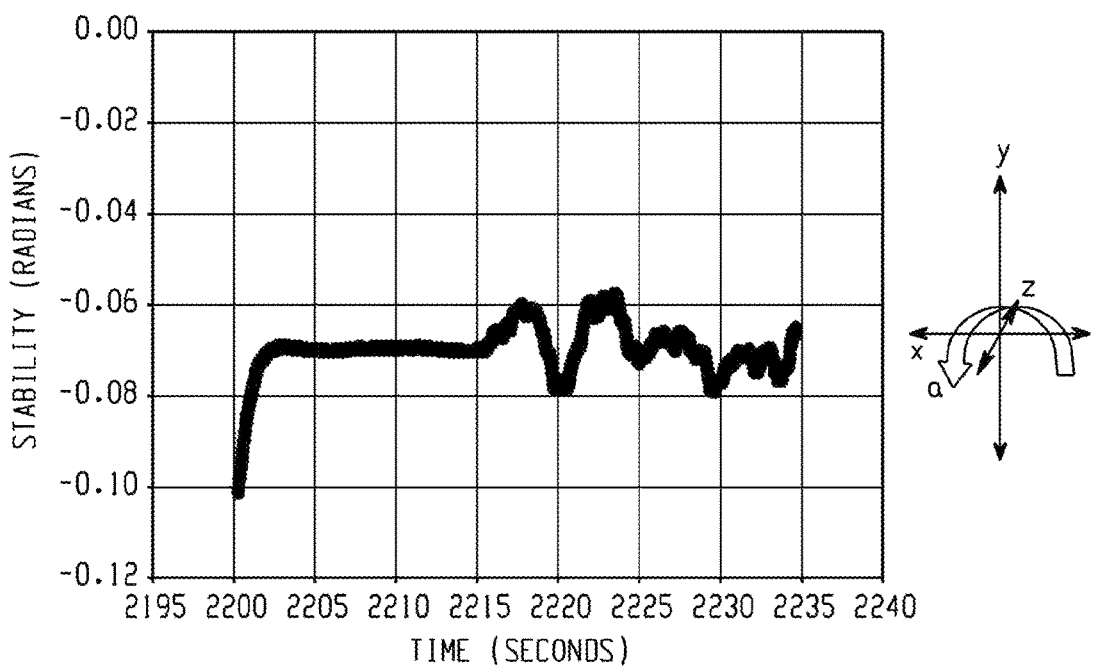
FIG. 27 is a graphical view of the time versus the stability of a truck tested with the drag-reducing aerodynamic system of FIG. 17.
Figure 28:
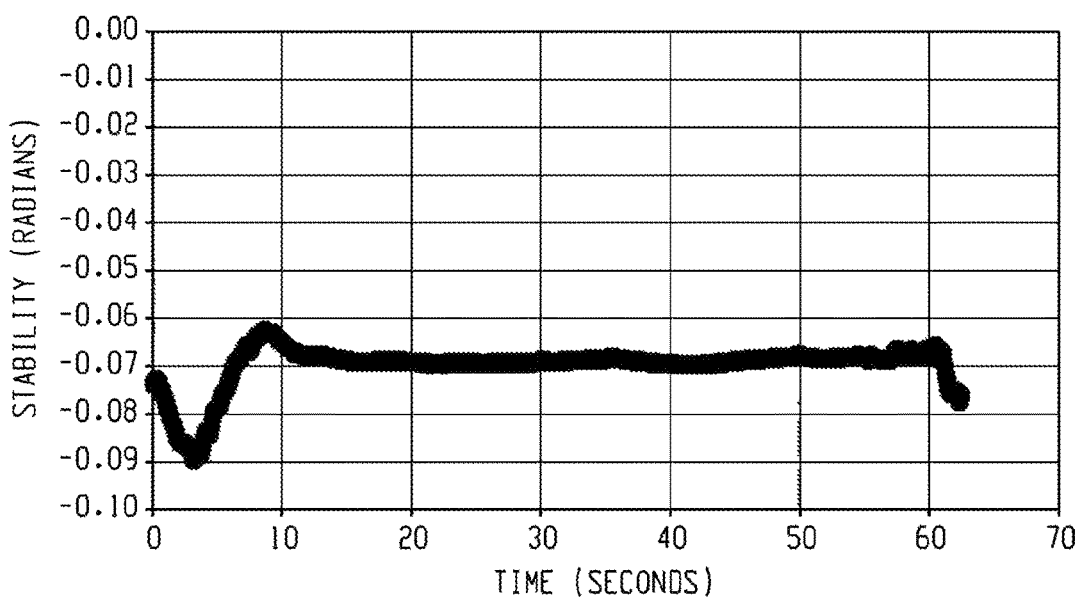
FIG. 28 is a graphical view of the time versus the stability of a truck tested with the drag-reducing aerodynamic system of FIGS. 19-26.

In this example, different roof fairings were analyzed for dynamic behavior at driving conditions including a speed of 45 miles per hour (mph) (72.4 kilometers per hour (kph)) with crosswinds of 30 mph (48.3 kph) and up to 75 mph (120.7 kph) without crosswind. The roof fairings were tested to stability to crosswind. An inertial measurement unit (IMU) was used to measure and report the angle of degree of rotation of the baseline roof fairing and the inventive roof fairing. IMUs are used to record movement in threes axis (indicated by "x", "y", and "z" in FIG. 27 and the rotation about these axis. Of interest was rotation about the axis of movement, which is indicated by arrow "a" in FIG. 27. A truck with a baseline roof fairing (Comparative Sample 3) having the design shown in FIG. 17 was tested and compared a truck with a roof fairing (Sample 4) have the design shown in FIGS. 19-26. The tests were conducted by driving a truck having the roof fairing design in FIG. 17 and a truck having the roof fairing having the design shown in FIGS. 19-26 at a constant speed of 45 mph (72.4 kph) through crosswind of 30-39 mph (48.3 kph to 62.8 kph). The stability was measured a function of time (reported in seconds). Results are shown in FIGS. 27 and 28, which are graphical representations of the stability, reported in radians versus time, reported in seconds.

A stable profile is indicated with a flat line across the time measured. The curves shown at either end arose because of a short track distance and having to turn the truck around. An unstable profile is shown in FIG. 27, indicating movement of the truck and subsequent stabilization. The original signal was not at 0 degrees because the IMU was taped to the dashboard of the truck and had an inclination of 4 degrees. The difference to the original signal is the instability of the truck. As shown in FIGS. 27 and 28, the baseline roof fairing (Comparative Sample 3) had lower stability as compared to the truck with the roof fairing of FIGS. 19-26 (Sample 4).

The stability of Sample 4 increased by 1.2° (0.02 radians) as compared to Comparative Sample 3, meaning that the crosswinds had an imperceptible influence on the truck. In FIG. 27, the baseline fairing varied by 0.012 radians or ±0.6 degrees. For the inventive fairing, there is no perceptible oscillation or instability. The tests demonstrate that the inventive roof fairings offer better crosswind stability than the baseline roof fairing, which translates to a potentially better handling of the truck under crosswind conditions. With cross-winds having essentially no effect on the truck, fuel economy can be improved with an overall decrease in drag with the designs disclosed herein.

The roof fairings disclosed herein can channel air away from the front end stagnation area of a vehicle (e.g., a tractor trailer) and can accelerate it through the gap between the truck tractor and the trailer. The roof fairings can include an optimized design that can include an outer surface shape and integration of air control features on the shape. The designs disclosed herein can result in a reduction of yaw averaged drag of 5% to 6% when compared to a baseline roof fairing. Such a reduction in drag can result in estimated fuel savings of approximately 3%.

The roof fairings and methods of making disclosed herein include at least the following embodiments:

Embodiment 1: A drag-reducing aerodynamic vehicle system, including: a body attached to a roof of a vehicle, wherein the body comprises an air inlet including slits in the body, wherein the slits are disposed laterally to one another on opposing sides of a bisection of the vehicle and wherein the slits extend a length all or part of the way from a top of the body to a bottom of the body; wherein the air inlet includes an air guide boss extending from an interior surface of the body; and wherein the air guide boss adjusts an air stagnation point away from a windshield and accelerates air flow between the vehicle and a trailer attached to the vehicle to prevent air recirculation to reduce air pressure and drag on the vehicle.

Embodiment 2: The drag-reducing aerodynamic vehicle system of Embodiment 1, wherein the body comprises a polymeric material.

Embodiment 3: The drag-reducing aerodynamic vehicle system of Embodiment 2, wherein the polymeric material is selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; high impact polystyrene; polyolefins; or a combination comprising at least one of the foregoing.

Embodiment 4: The drag-reducing aerodynamic vehicle system of any of Embodiments 1-3, wherein the vehicle has at least a 2.6% improvement in fuel economy as compared to a vehicle with a baseline roof fairing.

Embodiment 5: A drag-reducing aerodynamic vehicle system, including: a center piece protruding from a roof of a vehicle, wherein the center piece comprises a base having a wider section further from a vehicle windshield and wherein the base converges toward a narrower section proximate to the vehicle windshield; and top surface channels formed along the base of the center piece, wherein the center piece protrudes upward from the top surface channels; side surface channels formed by a raised edge of a portion of a planar face of the top surface channels and a ledge extending from another portion of the planar face of the top surface channels; wherein air flow toward the vehicle is fragmented between the top surface channels and the side surface channels to eliminate air stagnation at an upper edge of the vehicle and at upper corners of a trailer attached to the vehicle and wherein the channels push air away from the vehicle corners toward a top or side of the trailer, reducing drag forces occurring on the vehicle.

Embodiment 6: The drag-reducing aerodynamic vehicle system of Embodiment 5, wherein the body comprises a polymeric material.

Embodiment 7: The drag-reducing aerodynamic vehicle system of Embodiment 6, wherein the polymeric material is selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; high impact polystyrene; polyolefins; or a combination comprising at least one of the foregoing.

Embodiment 8: The drag-reducing aerodynamic vehicle system of Embodiment 6 or Embodiment 7, wherein the vehicle has at least a 1.90% improvement in fuel economy as compared to a vehicle with a baseline roof fairing.

Embodiment 9: A drag-reducing aerodynamic vehicle system, including: a central fairing extending from a roof of a vehicle; and side fairings disposed on either exterior end surface of the central fairing, wherein the side fairings comprise airflow guide vanes protruding from an interior surface of the side fairings, and wherein the airflow guide vanes attach to an exterior end surface of the central fairing; wherein air flows through the airflow guide vanes and is directed toward a rear of the vehicle to reduce air stagnation around the vehicle and accelerates air flow between the vehicle and a trailer attached to the vehicle to prevent air recirculation to reduce air pressure and drag on the vehicle.

Embodiment 10: The drag-reducing aerodynamic vehicle system of Embodiment 9, wherein the airflow guide vanes slide into corresponding recesses disposed on the exterior end surfaces of the central fairing.

Embodiment 11: The drag-reducing aerodynamic vehicle system of Embodiment 9 or Embodiment 10, wherein the central fairing further comprises support vanes extending from an air facing surface of the central fairing.

Embodiment 12: The drag-reducing aerodynamic vehicle system of any of Embodiments 9-11, wherein the side fairings include a bridge suspended over the central fairing, wherein the side fairings are attached to the support vanes of the central fairing.

Embodiment 13: The drag-reducing aerodynamic vehicle system of any of Embodiments 9-12, wherein the exterior end surfaces of the central fairing converge toward a pedestal of the central fairing, wherein the pedestal is located at a mid-point of the vehicle.

Embodiment 14: The drag-reducing aerodynamic vehicle system fairing of Embodiment 13, wherein the pedestal has a convex shape.

Embodiment 15: The drag-reducing aerodynamic vehicle system of any of Embodiments 9-14, wherein the body comprises a polymeric material.

Embodiment 16: The drag-reducing aerodynamic vehicle system of any of Embodiments 9-15, wherein the polymeric material is selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; high impact polystyrene; polyolefins; or a combination comprising at least one of the foregoing.

Embodiment 17: The drag-reducing aerodynamic vehicle system of any of Embodiments 9-16, wherein the vehicle has a 2.60% improvement in fuel economy as compared to a vehicle with a baseline roof fairing.

Embodiment 18: The drag-reducing aerodynamic vehicle system of any of Embodiments 9-17, wherein the airflow guide vanes extend angularly from the interior surface of the side fairings.

Embodiment 19: The drag-reducing aerodynamic vehicle system of any of Embodiments 9-18, wherein the airflow guide vanes control the direction of air flowing through the airflow guide vanes in the vertical direction.

Embodiment 20: A process of a making a drag-reducing aerodynamic vehicle system, including: injection molding a central fairing including exterior end surfaces; injection molding side fairings comprising airflow guide vanes protruding from an interior surface of the side fairings; and attaching the side fairings to the central fairing by attaching the airflow guide vanes to the exterior end surfaces of the central fairing; wherein air flows through the airflow guide vanes and is directed toward a rear of the vehicle to reduce air stagnation around the vehicle and accelerates air flow between the vehicle and a trailer attached to the vehicle to prevent air recirculation to reduce air pressure and drag on the vehicle.

Embodiment 21: The process of Embodiment 20, further comprising molding indentations disposed on exterior end surfaces of the central fairing, wherein the side fairings are attached to the central fairing by inserting the airflow guide vanes into the indentations.

Embodiment 22: The process of Embodiment 20 or Embodiment 21, wherein the body comprises a polymeric material.

Embodiment 23: The process of any of Embodiments 20-22, wherein the vehicle has at least a 2.9% improvement in fuel economy as compared to a vehicle with a baseline roof fairing.

Embodiment 24: The process of any of Embodiments 20-23, wherein the central fairing further comprises support vanes extending from an air facing surface of the central fairing.

Embodiment 25: The process of Embodiment 24, further comprising attaching the side fairings to the support vanes of the central fairing.

Embodiment 26: A process of making a drag-reducing aerodynamic vehicle system, including: injection molding in an injection mold a body configured for attachment to a roof of a vehicle with a sliding core, wherein the body comprises an air inlet extending through a surface of the body, wherein the air inlet includes an air guide boss extending from an interior surface of the body, wherein the air guide boss adjusts an air stagnation point away from a windshield to reduce air pressure and drag on the vehicle; and ejecting the drag-reducing aerodynamic vehicle system from the injection mold using the sliding core.

Embodiment 27: The process of Embodiment 26, wherein the body comprises a polymeric material.

Embodiment 28: The process of Embodiment 27, wherein the polymeric material is selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; high impact polystyrene; polyolefins; or a combination comprising at least one of the foregoing.

Embodiment 29; The process of any of Embodiments 26-28, wherein the vehicle has at least a 2.6% improvement in fuel economy as compared to a vehicle with a baseline roof fairing.

Embodiment 30: A drag-reducing aerodynamic vehicle system, comprising: a frontal member in physical communication with a rear member, wherein the frontal member and the rear member extend from a roof of a vehicle, wherein the frontal member comprises fin boxes having airflow guide vanes disposed perpendicularly between sidewalls of the fin boxes; wherein air flows through the airflow guide vanes and is directed toward a rear of the vehicle to reduce air stagnation around the vehicle; and wherein the air flow guide vanes accelerate air flow between the vehicle and a trailer attached to the vehicle to prevent air circulation and reduce drag on the vehicle.

Embodiment 31: The drag-reducing aerodynamic vehicle system of Embodiment 30, wherein the frontal member includes an outer casing and the rear member includes an inner casing.

Embodiment 32: The drag-reducing aerodynamic vehicle system of Embodiment 30 or Embodiment 31, wherein the airflow guide vanes are parallel a horizontal surface or have a rake with respect to a length of the vehicle.

Embodiment 33: The drag-reducing aerodynamic vehicle system of any of Embodiments 30-32, wherein the fin boxes are formed integrally with the outer casing.

Embodiment 34: The drag-reducing aerodynamic vehicle system of any of Embodiments 30-32, wherein the fin boxes are formed separately from the outer casing.

Embodiment 35: The drag-reducing aerodynamic vehicle system of any of Embodiments 30-34, wherein the frontal member includes an arcuate cap converging toward a centerline of the drag-reducing aerodynamic vehicle system.

Embodiment 36: The drag-reducing aerodynamic vehicle system of any of Embodiments 30-35, wherein the rear member further includes a top, wherein the inner casing and top are configured to mate with outer casing of frontal member.

Embodiment 37: The drag-reducing aerodynamic vehicle system of any of Embodiments 30-36, wherein the top is formed integrally with the inner casing.

Embodiment 38: The drag-reducing aerodynamic vehicle system of any of Embodiments 30-36, wherein the top is formed separately from the inner casing.

Embodiment 39: The drag-reducing aerodynamic vehicle system of any of Embodiments 30-38, wherein the fin boxes include a multilayer structure.

Embodiment 40: A method of making a drag-reducing aerodynamic vehicle system of any of Embodiments 30-39, comprising: forming the frontal member and the rear member through an additive manufacturing process.

Embodiment 41: The method of Embodiment 40, wherein forming the frontal member through an additive manufacturing process further comprises forming the fin boxes through the additive manufacturing process.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless otherwise specified herein, any reference to standards, regulations, testing methods and the like, such as ASTM D256, ASTM D638, ASTM D790, ASTM D1238, ASTM D 4812, ASTM 4935, and UL94 refer to the standard, regulation, guidance or method that is in force at the time of filing of the present application.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A drag-reducing aerodynamic vehicle system, comprising:
   a central fairing extending from a roof of a vehicle; and
   side fairings disposed on either exterior end surface of the central fairing, wherein the side fairings comprise airflow guide vanes protruding from an interior surface of the side fairings and wherein the airflow guide vanes attach to an exterior end surface of the central fairing;
   wherein air flows through the airflow guide vanes and is directed toward a rear of the vehicle to reduce air stagnation around the vehicle and accelerates air flow between the vehicle and a trailer attached to the vehicle to prevent air recirculation to reduce air pressure and drag on the vehicle.

2. The drag-reducing aerodynamic vehicle system of claim 1, wherein the airflow guide vanes slide into corresponding recesses disposed on the exterior end surfaces of the central fairing.

3. The drag-reducing aerodynamic vehicle system of claim 1, wherein the central fairing further comprises support vanes extending from an air facing surface of the central fairing.

4. The drag-reducing aerodynamic vehicle system of claim 1, wherein the side fairings include a bridge suspended over the central fairing, wherein the side fairings are attached to the support vanes of the central fairing.

5. The drag-reducing aerodynamic vehicle system of claim 1, wherein the exterior end surfaces of the central fairing converge toward a pedestal of the central fairing, wherein the pedestal is located at a mid-point of the vehicle.

6. The drag-reducing aerodynamic vehicle system of claim 5, wherein the pedestal (90) has a convex shape.

7. The drag-reducing aerodynamic vehicle system of claim 1, comprising a polymeric material selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; high impact polystyrene; polyolefins; or a combination comprising at least one of the foregoing.

8. The drag-reducing aerodynamic vehicle system of claim 1, wherein the airflow guide vanes extend angularly from the interior surface of the side fairings.

9. A process of making the drag-reducing aerodynamic vehicle system of claim 1, comprising:
   injection molding a central fairing including exterior end surfaces;
   injection molding side fairings comprising airflow guide vanes (78) protruding from an interior surface of the side fairings; and
   attaching the side fairings to the central fairing by attaching the airflow guide vanes to the exterior end surfaces of the central fairing;
   wherein air flows through the airflow guide vanes and is directed toward a rear of the vehicle to reduce air stagnation around the vehicle and accelerates air flow between the vehicle and a trailer attached to the vehicle to prevent air recirculation to reduce air pressure and drag on the vehicle.

10. The process of claim 9, further comprising molding indentations disposed on exterior end surfaces of the central fairing, wherein the side fairings are attached to the central fairing by inserting the airflow guide vanes into the indentations.

11. The process of claim 9, further comprising attaching the side fairings to support vanes extending from an air facing surface of the central fairing.

12. A process of making a drag-reducing aerodynamic vehicle system, comprising a body attached to a roof of a vehicle, wherein the body comprises an air inlet including slits in the body, wherein the slits are disposed laterally to one another on opposing sides of a bisection of the vehicle and wherein the slits extend a length all or part of the way from a top of the body to a bottom of the body;
   wherein the air inlet includes an air guide boss extending from an interior surface of the body; and
   wherein the air entering the air inlet exits through an outlet and moves toward a side and rear of the vehicle, thereby reducing the drag experienced by the vehicle and wherein the air guide boss adjusts an air stagnation point away from a windshield and accelerates air flow between the vehicle and a trailer attached to the vehicle to prevent air recirculation to reduce air pressure and drag on the vehicle, wherein the method comprises:
   injection molding in an injection mold a body configured for attachment to a roof of a vehicle with a sliding core, wherein the body comprises an air inlet extending through a surface of the body, wherein the air inlet includes an air guide boss extending from an interior surface of the body, wherein the air guide boss adjusts an air stagnation point away from a windshield to reduce air pressure and drag on the vehicle; and
   ejecting the drag-reducing aerodynamic vehicle system from the injection mold using the sliding core.

13. A drag-reducing aerodynamic vehicle system, comprising:

a frontal member in physical communication with a rear member, wherein the frontal member and the rear member extend from a roof of a vehicle, wherein the frontal member comprises fin boxes having airflow guide vanes disposed perpendicularly between sidewalls of the fin boxes;

wherein air flows through the airflow guide vanes and is directed toward a rear of the vehicle to reduce air stagnation around the vehicle; and wherein the air flow guide vanes accelerate air flow between the vehicle and a trailer attached to the vehicle to prevent air circulation and reduce drag on the vehicle.

14. The drag-reducing aerodynamic vehicle system of claim 13, wherein the frontal member includes an outer casing and the rear member includes an inner casing.

15. The drag-reducing aerodynamic vehicle system of claim 13, wherein the frontal member includes an arcuate cap converging toward a centerline of the drag-reducing aerodynamic vehicle system.

16. The drag-reducing aerodynamic vehicle system of claim 13, wherein the airflow guide vanes are parallel a horizontal surface or have a rake with respect to a length of the vehicle.

17. The drag-reducing aerodynamic vehicle system of claim 13, wherein the rear member further includes a top, wherein the inner casing and top are configured to mate with outer casing of frontal member.

18. A method of making the drag-reducing aerodynamic vehicle system of claim 13, comprising:

forming the frontal member and the rear member through an additive manufacturing process.

* * * * *